US012572015B2

(12) United States Patent  (10) Patent No.: US 12,572,015 B2
Morrison et al.  (45) Date of Patent: Mar. 10, 2026

(54) TRANSPARENT OPTICAL MODULE USING PIXEL PATCHES AND ASSOCIATED LENSLETS

(71) Applicant: NewSight Reality, Inc., Roanoke, VA (US)

(72) Inventors: Rick Morrison, Longmont, CO (US); Igor Landau, Boulder, CO (US); Svetlana Samoilova, Alameda, CA (US)

(73) Assignee: NewSight Reality, Inc., Roanoke, VA (US)

( * ) Notice: Subject to any disclaimer, the term of this patent is extended or adjusted under 35 U.S.C. 154(b) by 562 days.

(21) Appl. No.: 17/953,203

(22) Filed: Sep. 26, 2022

(65) Prior Publication Data

US 2023/0033105 A1 Feb. 2, 2023

Related U.S. Application Data

(63) Continuation of application No. 17/103,703, filed on Nov. 24, 2020, now Pat. No. 11,454,815, which is a
(Continued)

(51) Int. Cl.
*G02B 27/01* (2006.01)
*G06T 5/50* (2006.01)
(Continued)

(52) U.S. Cl.
CPC ..... *G02B 27/0172* (2013.01); *G02B 27/0179* (2013.01); *G06T 5/50* (2013.01);
(Continued)

(58) Field of Classification Search
CPC ............ G02B 27/0172; G02B 27/0179; G06T 19/006
See application file for complete search history.

(56) References Cited

U.S. PATENT DOCUMENTS 6,396,639 B1    5/2002    Togino et al.
7,318,646 B2    1/2008    Bernard et al.
(Continued)

FOREIGN PATENT DOCUMENTS

WO        2013144311 A1    10/2013
WO        2019202554 A1    10/2019

OTHER PUBLICATIONS

Application No. PCT/US 21/60730, International Search Report and Written Opinion dated Mar. 16, 2022.
(Continued)

*Primary Examiner* — Charles Tseng
(74) *Attorney, Agent, or Firm* — Woods Rogers Vandeventer Black PLC; Nathan A. Evans

(57) ABSTRACT

A transparent optical module system or device comprising an optical architecture hierarchy based on a patch unit. In aspects, the transparent optical module comprises a display sparsely populated with pixels. The patch unit comprises one or more regions of display pixels, or a pixel pattern(s), and an associated lenslet, for example on a microlens array. The lenslet is capable of transmitting display-emitted light to an eye of the wearer of the transparent optical module, which then focuses the light to form a retinal image, which is seen or perceived by the wearer. The patch units can be combined further into patch groups, wherein members of a group serve a similar role in retinal image production as a patch unit and/or lenslet. This hierarchy allows the system to be scaled to larger and more complex systems.

35 Claims, 22 Drawing Sheets

Related U.S. Application Data continuation of application No. 16/859,092, filed on Apr. 27, 2020, now abandoned, which is a continuation of application No. 16/449,395, filed on Jun. 22, 2019, now Pat. No. 10,634,921, which is a continuation-in-part of application No. 16/289,623, filed on Feb. 28, 2019, now Pat. No. 10,634,912, which is a continuation-in-part of application No. 16/008,707, filed on Jun. 14, 2018, now Pat. No. 10,466,487, which is a continuation-in-part of application No. 15/994,595, filed on May 31, 2018, now Pat. No. 10,884,246, said application No. 17/103,703 is a continuation of application No. 16/571,248, filed on Sep. 16, 2019, now abandoned, and a continuation of application No. 16/855,964, filed on Apr. 22, 2020, now Pat. No. 12,055,715, and a continuation of application No. 16/868,504, filed on May 6, 2020, now abandoned, and a continuation of application No. 16/902,003, filed on Jun. 15, 2020, now Pat. No. 10,921,613.

(60) Provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/542,168, filed on Aug. 7, 2017, provisional application No. 62/530,638, filed on Jul. 10, 2017, provisional application No. 62/522,866, filed on Jun. 21, 2017, provisional application No. 62/513,828, filed on Jun. 1, 2017, provisional application No. 62/694,222, filed on Jul. 5, 2018, provisional application No. 62/546,473, filed on Aug. 16, 2017, provisional application No. 62/700,621, filed on Jul. 19, 2018, provisional application No. 62/711,669, filed on Jul. 30, 2018, provisional application No. 62/753,583, filed on Oct. 31, 2018, provisional application No. 62/769,883, filed on Nov. 20, 2018, provisional application No. 62/700,632, filed on Jul. 19, 2018, provisional application No. 62/703,909, filed on Jul. 27, 2018, provisional application No. 62/703,911, filed on Jul. 27, 2018, provisional application No. 62/717,424, filed on Aug. 10, 2018, provisional application No. 62/720,113, filed on Aug. 20, 2018, provisional application No. 62/720,116, filed on Aug. 21, 2018, provisional application No. 62/728,251, filed on Sep. 7, 2018, provisional application No. 62/732,039, filed on Sep. 17, 2018, provisional application No. 62/732,138, filed on Sep. 17, 2018, provisional application No. 62/739,904, filed on Oct. 2, 2018, provisional application No. 62/739,907, filed on Oct. 2, 2018, provisional application No. 62/752,739, filed on Oct. 30, 2018, provisional application No. 62/754,929, filed on Nov. 2, 2018, provisional application No. 62/755,626, filed on Nov. 5, 2018, provisional application No. 62/755,630, filed on Nov. 5, 2018, provisional application No. 62/756,528, filed on Nov. 6, 2018, provisional application No. 62/756,542, filed on Nov. 6, 2018, provisional application No. 62/770,210, filed on Nov. 21, 2018, provisional application No. 62/771,204, filed on Nov. 26, 2018, provisional application No. 62/774,362, filed on Dec. 3, 2018, provisional application No. 62/775,945, filed on Dec. 6, 2018, provisional application No. 62/778,960, filed on Dec. 13, 2018, provisional application No. 62/778,972, filed on Dec. 13, 2018, provisional application No. 62/780,391, filed on Dec. 17, 2018, provisional application No. 62/780,396, filed on Dec. 17, 2018, provisional application No. 62/783,596, filed on Dec. 21, 2018, provisional application No. 62/785,284, filed on Dec. 27, 2018, provisional application No. 62/787,834, filed on Jan. 3, 2019, provisional application No. 62/793,166, filed on Jan. 16, 2019, provisional application No. 62/794,779, filed on Jan. 21, 2019, provisional application No. 62/796,410, filed on Jan. 24, 2019, provisional application No. 62/783,603, filed on Dec. 21, 2018, provisional application No. 62/788,275, filed on Jan. 4, 2019, provisional application No. 62/788,993, filed on Jan. 7, 2019, provisional application No. 62/788,995, filed on Jan. 7, 2019, provisional application No. 62/790,514, filed on Jan. 10, 2019, provisional application No. 62/790,516, filed on Jan. 10, 2019, provisional application No. 62/796,388, filed on Jan. 24, 2019, provisional application No. 62/830,645, filed on Apr. 8, 2019, provisional application No. 62/847,427, filed on May 14, 2019, provisional application No. 62/848,636, filed on May 16, 2019, provisional application No. 62/971,432, filed on Feb. 7, 2020, provisional application No. 63/022,996, filed on May 11, 2020.

(51) Int. Cl.
G06T 11/00 (2006.01)
G06T 19/00 (2011.01)

(52) U.S. Cl.
CPC ............ *G06T 11/00* (2013.01); *G06T 19/006* (2013.01); *G02B 2027/0187* (2013.01)

(56) References Cited

U.S. PATENT DOCUMENTS

| | | | |
|---|---|---|---|
| 7,365,908 B2 | 4/2008 | Dolgoff | |
| 9,519,144 B2 | 12/2016 | Lanman et al. | |
| 9,746,673 B2 | 8/2017 | Schreiber et al. | |
| 9,841,537 B2 | 12/2017 | Luebke et al. | |
| 9,989,765 B2 | 6/2018 | Jepsen | |
| 10,162,182 B2 | 12/2018 | Jepsen | |
| 2013/0021226 A1 | 1/2013 | Bell | |
| 2013/0286053 A1 | 10/2013 | Fleck et al. | |
| 2014/0118829 A1 | 5/2014 | Ma et al. | |
| 2014/0168034 A1* | 6/2014 | Luebke ................ H04N 13/339 |
| | | | 345/8 |
| 2015/0049390 A1 | 2/2015 | Lanman et al. | |
| 2015/0177514 A1 | 6/2015 | Maimone et al. | |
| 2015/0262424 A1 | 9/2015 | Tabaka et al. | |
| 2017/0108697 A1 | 4/2017 | El-Ghoroury et al. | |
| 2017/0139211 A1 | 5/2017 | Trail | |
| 2017/0171533 A1 | 6/2017 | Benitez et al. | |
| 2018/0113311 A1 | 4/2018 | Klug et al. | |
| 2018/0196265 A1 | 7/2018 | Bouchier et al. | |
| 2019/0064526 A1 | 2/2019 | Connor | |
| 2020/0204789 A1 | 6/2020 | Minano et al. | |

OTHER PUBLICATIONS

Park, Hongbae S., et al., "Compact Near-Eye Display System Using a Superlens-based Microlens Array," Optics Express 30618, vol. 23, No. 24, Nov. 30, 2015.

(56) References Cited

OTHER PUBLICATIONS

Yao, Cheng et al., "Design of an Optical See-Through Light-Field Near-Eye Display Using Discrete Lenslet Array," Optics Express 18292, vol. 26, No. 14, Jul. 9, 2018.

Wan, Wenqiang et al., "Optical See-Through Near-Eye Display Based on Dot Matrix Nanogratings," Optical Materials 107, May 29, 2020.

* cited by examiner

Multiple virtual image focal planes, distances, depths, or combinations thereof

Patch group example with lenslet having four differing focal lengths producing focal planes at 1, 2, 3, and 4+ meters.

Figure 15 – Lenslet of various sizes composing patch units.

Figure 19 - Dispersed/Interlaced patch group layout. In this example, two patch units from alternate patch groups (as identified by color) fill the space between common group elements.

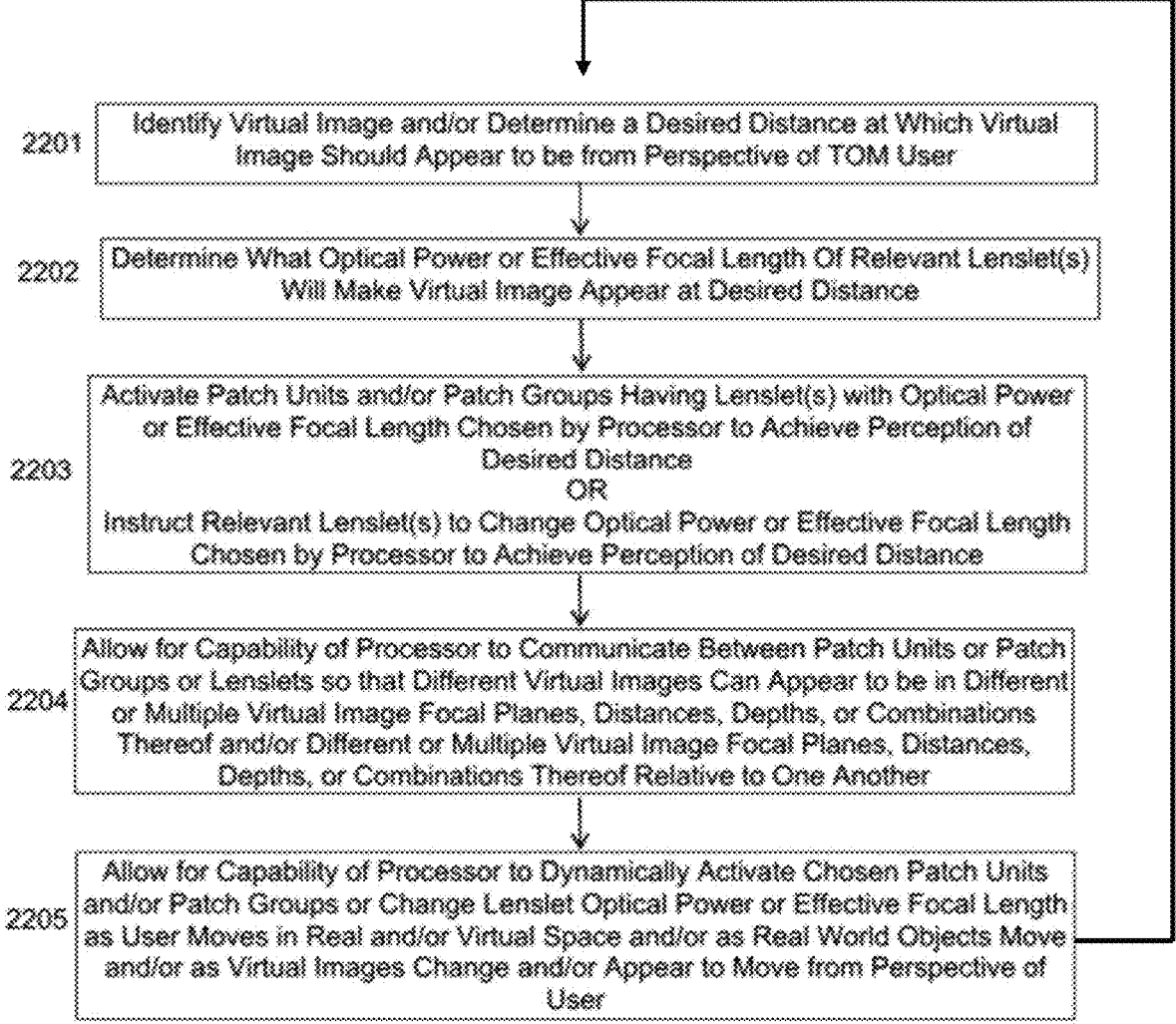

2201  Identify Virtual Image and/or Determine a Desired Distance at Which Virtual Image Should Appear to be from Perspective of TOM User 2202  Determine What Optical Power or Effective Focal Length Of Relevant Lenslet(s) Will Make Virtual Image Appear at Desired Distance 2203  Activate Patch Units and/or Patch Groups Having Lenslet(s) with Optical Power or Effective Focal Length Chosen by Processor to Achieve Perception of Desired Distance
OR
Instruct Relevant Lenslet(s) to Change Optical Power or Effective Focal Length Chosen by Processor to Achieve Perception of Desired Distance 2204  Allow for Capability of Processor to Communicate Between Patch Units or Patch Groups or Lenslets so that Different Virtual Images Can Appear to be in Different or Multiple Virtual Image Focal Planes, Distances, Depths, or Combinations Thereof and/or Different or Multiple Virtual Image Focal Planes, Distances, Depths, or Combinations Thereof Relative to One Another 2205  Allow for Capability of Processor to Dynamically Activate Chosen Patch Units and/or Patch Groups or Change Lenslet Optical Power or Effective Focal Length as User Moves in Real and/or Virtual Space and/or as Real World Objects Move and/or as Virtual Images Change and/or Appear to Move from Perspective of User

FIG. 22

TRANSPARENT OPTICAL MODULE USING PIXEL PATCHES AND ASSOCIATED LENSLETS

CROSS-REFERENCE TO RELATED APPLICATIONS

The present application is a continuation of and relies on the disclosures of and claims priority to and the benefit of the filing dates of U.S. patent application Ser. No. 17/103,703 filed Nov. 24, 2020, which claims priority to U.S. patent application Ser. No. 16/859,092 filed Apr. 27, 2020, which claims priority to U.S. patent application Ser. No. 16/449,395 filed Jun. 22, 2019, which claims priority to U.S. patent application Ser. No. 16/289,623 filed Feb. 28, 2019, which claims priority to U.S. patent application Ser. No. 16/008,707 filed Jun. 14, 2018, which claims priority to U.S. application Ser. No. 15/994,595 filed May 31, 2018, as well as several U.S. Provisional Patent Applications. See Application Data Sheet for details.

The disclosures of each of the-above referenced applications and those in the Application Data Sheet are incorporated by reference herein in their entireties.

BACKGROUND OF THE INVENTION

Field of the Invention

The present invention is directed to operation of a near eye augmented reality ("AR") or mixed reality ("MR") system that integrates the virtual image generated by the near eye display to the real environment taking account of the visual processes of the retina, the visual cortex and the oculomotor system. Specifically, the current invention is directed to transparent optical module ("TOM") architecture, which is built and/or configured in a manner to provide system scalability.

Description of Related Art

Currently existing AR or MR systems in most cases have a large form factor and are awkward to use, heavy, demanding of high power, and/or expensive. For these systems to have an increased level of adoption, a transformational technology change or innovation is needed to improve what is currently available. In addition, it is important that any such innovation can be easily adapted to current, established eyewear and ophthalmic lens manufacturing and distribution. The innovation disclosed herein teaches such a transformational breakthrough for the AR and MR industries. In this regard, the current innovation can also be used with virtual reality and enhanced reality.

SUMMARY OF THE INVENTION

In embodiments of the present invention, a transparent optical module ("TOM") system or device comprises an optical architecture hierarchy based on a patch unit. In aspects, the module may be transparent, transmissive, partially transparent, partially transmissive, opaque, partially opaque, or combinations thereof. In aspects, the patch unit comprises one or more regions of display pixels, or a pattern(s) or pixels, and an associated lenslet, for example on a microlens array ("MLA"). The lenslet is capable of transmitting display-emitted light to an eye of the wearer of the TOM, which then focuses the light to form a retinal image, which is seen or perceived by the wearer. The patch units can be combined further into patch groups, wherein members of a group serve a similar role in retinal image production as a patch unit and/or lenslet. This hierarchy allows the system to be scaled to larger and more complex systems.

Accordingly, TOM architecture is built in a manner that provides system scalability. In general, there are two basic elements of TOM architecture as described herein: a patch unit (optical) and a patch group (layout). A lenslet focuses a display pixel or patch to a retinal spot or portion. The lenslet field of view supports imaging an area of an xLED display, such as a pixel patch, and in aspects, "xLED" may be used to refer to, cover, or describe, but is not limited to: OLED (organic Light Emitting Diode), TOLED (transparent OLED), microLED (also μLED and mLED), iLED (refers to microLED, inorganic LED), PMOLED and AMOLED (Passive Matrix and Active Matrix OLEDs), QD-LED (quantum dot LED), or combinations thereof.

A lenslet and its pixel patch will generally be referred to herein as a patch unit. In aspects, multiple patch units are used to build a larger mosaic image on the retina. Due to magnification, a sparse set of patches and lenslets (i.e., patch unit(s)) can produce a full image as perceived by a user; accordingly, patch units are capable of being sparsely distributed due to magnification. The array of lenslets is again generally referred to as a MicroLenslet Array or Microlens array ("MLA"). In aspects, the display pixel patches form a sparse microdisplay. The intermediate area between primary patch units allows inclusion of additional patch units to provide extra functionality. Sets of patch units that produce retinal images that overlay each other (or in cases are separate or projected side-by-side on the retina) are sometimes defined herein as a patch group. In aspects, patch units are configured so that lenslets do not overlap. In cases, it may be necessary to shield light to control stray light transmitted in between lenslets or potentially couple to neighboring lenslets. Since patch units in a patch group can act individually, in aspects, a patch unit or units can be illuminated independently to support different functions. A grid of patch units can be rectangular or hexagonally packed or any other shape. Rectangular packing, in cases, simplifies some aspects of determining how to decompose the digital image data into sub-images. The notion of the patch unit and patch group or group of pixel patches applies to both static and dynamic MLAs. In aspects, a dynamic (or active) MLA may refer to, cover, or describe one or more of:

switchable MLA;
    tunable MLA;
    electrically switching lenslets;
    nematic phase lenslets;
    smectic phase lenslets;
    liquid crystals;
    cholesteric liquid crystals;
    polymer encapsulated liquid crystals;
    nano-scale polymer encapsulated liquid crystals;
    blue phase liquid crystals;
    electrowetting lenslets;
    electrostatic lenslets;
    ferrofuidic lenslets;
    dielectrophoretic lenslets;
    pressure actuated liquid lenslets;
    micro-mechanical variable focus lenslets;
    elastomeric membrane lenslets;
    mechanically stretchable lenslets;
    chemically ion activated lenslets; and/or
    acousto-optical lenslets.

In embodiments, the invention is a system for producing an image including a see-through near eye optical module comprising a see-through near eye display and a micro-lenslet array, wherein the see-through near eye display comprises a plurality of light-emitting pixels or pixel patterns and the micro-lenslet array comprises one or more lenslets; wherein the plurality of light-emitting pixels are configured as a pixel patch; wherein a pixel patch in optical communication with the one or more lenslets is configured as a patch unit; and wherein the see-through near eye display and the micro-lenslet array are capable of permitting light rays from a physical object in an external environment to pass through the see-through near eye optical module to the user's retina. The light from the display and the real world external environment together are capable of generating augmented reality, mixed reality, enhanced reality, virtual reality, etc. In aspects, the TOM and/or optical module is hermetically sealed.

For embodiments, there are various optical terms and parameters that describe the operation and performance of the lenslet and the patch unit as described herein. These terms include, but are not limited to, magnification, field of view, resolution, and visual acuity, by way of example. Some of these parameters may influence the optical design and manufacture of the lenslet as described herein, or as would be understood by one of skill in the art.

The term field of view ("FOV") in aspects describes the (maximum) perceived angular extent of a patch unit image on the retina. This FOV can be described as an angle or as the pixel area or pixel patch on the patch unit. In other aspects, FOV may refer to an angle or area of a patch group. It is typically, but not always, desirable to produce a large patch unit FOV, or the largest patch unit FOV feasible. However, factors such as the lenslet performance and stray light generation have an influence on the design FOV. For example, an aspherical lens surface form may be necessary to improve imaging quality for pixels near an edge or extreme edge of the patch unit FOV. Additionally, the lenslet pitch can be designed to vary from the center to the edge of the lenslet array to, in cases, improve imaging properties (e.g., by minimizing Coma and other aberrations) from the periphery of the pixel patch. The patch unit FOV according to preferred embodiments described herein is designed to produce an image that can fill the high-resolution foveal region of a user's retina. The FOV in aspects can range from a 10-degree full angular field up to larger values. Therefore, multiple patch groups can be used to produce a complete wide-angle view.

In embodiments described herein, magnification may describe the relationship between the angular extent at the retina versus that of the display pixel patch or patch unit. In a possible embodiment of a TOM design described herein, an image magnification is preferably about 7× to 10×, whereas a single lens, single display VR system would have a magnification closer to 1.

The visual acuity of the eye refers to the clarity of vision and ability to recognize detail as described herein or as would be understood by one of skill in the art. The typical eye is able to detect about 1 arc minute angular resolution and is sometimes presented in the form of a measurement, such as 20/20 vision. The visual acuity depends on the retinal resolving elements (rods and cones), aberrations from the eye's lens, and diffractive effects due to aperture size. The objective of the TOM as described herein is to present information that is a suitable or preferable match to the eye's visual acuity. For example, text should be sufficiently sharp and sufficiently large to be readable, while images should provide preferably well-resolved features. The application of the TOM and system described herein will in aspects determine the visual acuity level that the display, system, or TOM be able to achieve.

In aspects and as understood by one of skill in the art, stray light is light that does not follow the correct or preferred path through the TOM and may produce a glare or background haze that reduces overall contrast of the desired images. The desired image light, in aspects, includes the real world view formed from light from the external world that passes through the transparent areas of the display substrate and the regions between lenslets on the MLA, especially in the case of a static MLA.

The stray light for a dynamic MLA differs from a static MLA. In embodiments, a dynamic MLA is expected to be "on" for only a fraction of time as a wearer uses the TOM described herein. During this switched on time, the MLA operates as a set of lenslets while the display is synchronized to emit light. During the switched off state, in aspects, the MLA behaves as though it is a transparent window, and the display does not emit light. During the on state, the stray light situation will be the same or similar as described for a static MLA. However, when the dynamic MLA is switched off, typically less stray light will be present compared to a static MLA.

The desired virtual image is formed from light emitted by a display pixel or pixel patch, for example, and then directed through its patch unit lenslet to the eye forming the retinal image. Real world light that passes through a lenslet and is redirected is one form of stray light. Another form of stray light is display light that passes through the region between lenslets and is therefore not focused. Also, light from a patch unit pixel or pixel patch that passes through an adjacent or distant patch unit lenslet (and, in cases, misses its own patch unit lenslet) will be focused incorrectly and is considered stray light.

In embodiments, a pixel's or pixel patch's emitted light may be directed through a refractive, reflective, and/or diffractive TOM lens or lenslet. In embodiments, the lenslet may be fabricated as a curved surface on an optically transparent substrate. The surface may have a spherical, aspherical, or other arbitrary mathematical description. The lenslet could also provide focusing capability by dynamically adjusting its power generating properties such as index of refraction and/or curvature structures. The lenslet may be composed of multiple layers of material or a single material. A diffractive or holographic element may direct the light using wave interference methods. The lenslet may comprise a single surface on a supporting substrate, or be composed of multiple surfaces on dual sides of the substrate or multiple substrates. The apertures of a multiple component lenslet may be oriented in line with each other, or not. The lenslet or lenslet set may be decomposed into multiple areas with intervening transparent or shielding areas. The lenslet apertures may be circular, square, hexagonal, or any arbitrary shape for optimum image quality while minimizing stray light.

The use of Liquid Crystals (LCs) is one way to realize a dynamic MLA by electrically switching the LC's index of refraction. A number of different LC technologies may be used separately or in combinations, such as conventional nematic or smectic phase and cholesteric liquid crystals. Additionally, polymer encapsulated LCs (PDLCs) as well as their nano-scale variety (nPDLCs) offer, in cases, advantages for construction of dynamic MLAs, as they are polarization invariant and therefore can utilize unpolarized light from conventional displays such as OLEDs and iLEDS. Further, "blue" phase LCs also possess polarization independent properties.

The above LC variations can be employed to construct conventional e.g. refractive lenses as have been described in this disclosure, as well as diffractive and holographic active MLAs.

In addition to LCs, other technologies can be employed for fabrication of active or dynamic MLAs; these include but are not limited to, electrowetting, electrostatic, ferrofuidic and dielectrophoretic and pressure actuated liquid lenses. Various micro-mechanical variable focus lenses may also be used such as elastomeric membranes, which, in aspects, are mechanically stretched. Chemically ion activated lenses and lenses that utilize the various acousto-optical effects can also be employed in dynamic MLAs.

All the above active/dynamic MLA technologies can be used separately, and/or in combination to enhance, improve, or optimize image quality and also to minimize undesired stray light.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 15 is a schematic diagram showing a possible embodiment of the current invention showing lenslets of various sizes composing patch units.

FIG. 22 is a flowchart showing a possible embodiment of the current invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 1:
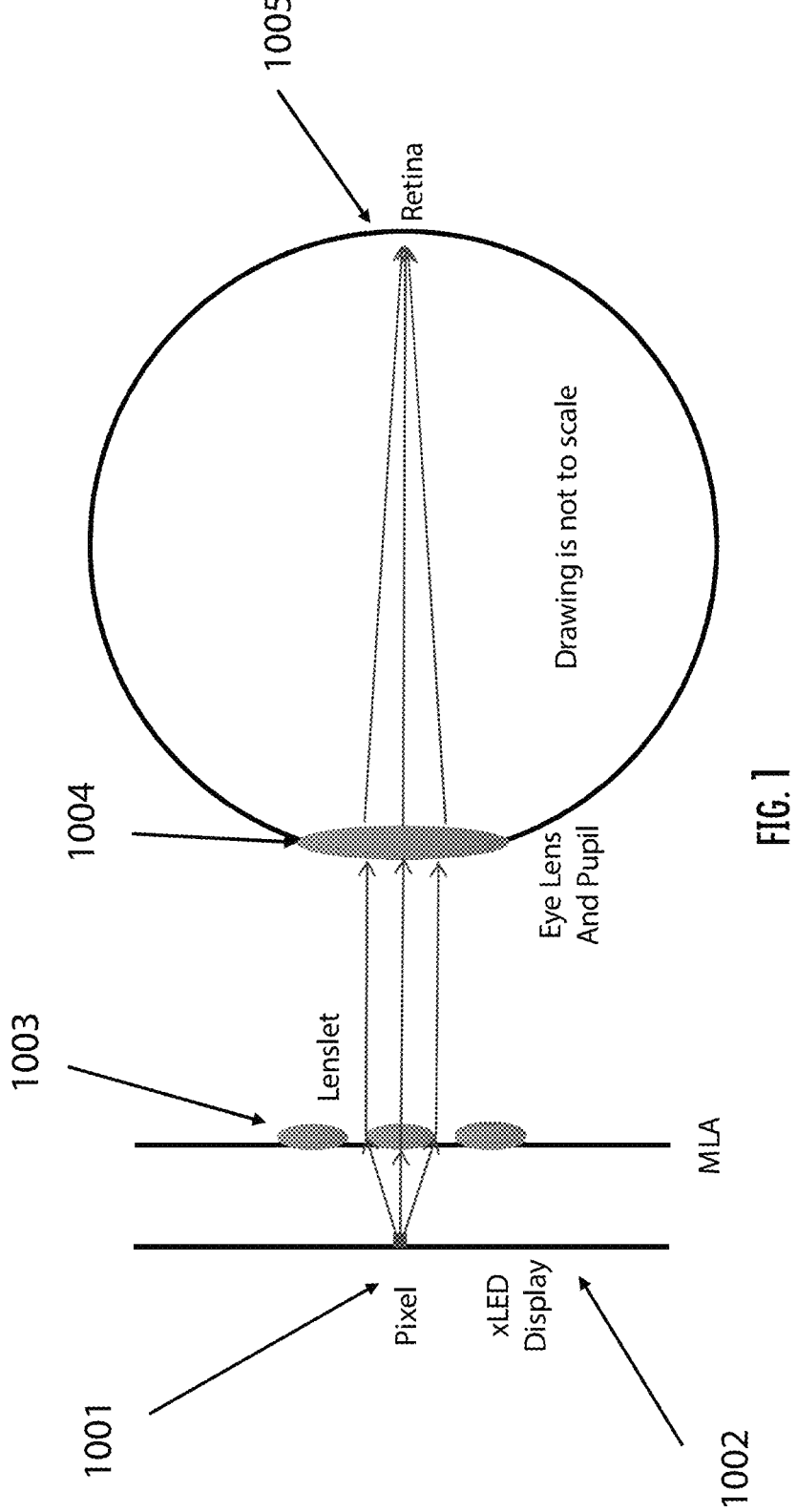
FIG. 1 is a schematic diagram showing a possible embodiment of the current invention showing a configuration of display, to lenslet(s), to pupil, to retina.

FIG. 1 shows one possible embodiment of an optical design that relays device pixel light to a retinal spot. In the particular example of FIG. 1, the schematic shows how light from a single pixel or element 1001 located on or near the display device 1002 1002 is collected by the lenslet 1003, transmitted to a wearer's eye pupil 1004, and then imaged by the wearer's eye to a spot or portion on the wearer's retina 1005. In aspects, the lenslet aperture is preferably smaller than an eye pupil aperture, and a lenslet aperture diameter determines a resolvable retinal spot size. (The drawing is not necessarily to scale, and, in aspects, the spacing between MLA and eye will be larger than shown.)

In embodiments, the lenslet diameter will be designed or made to be less than the eye pupil diameter. The lenslet diameter is a factor in determining the size of the resolvable retinal spot that can be achieved. Lenslet diameter may also influence the amount of light collected from the display element (e.g., a pixel, pixel patch, or patch group) and thus the perceived brightness of, for example, a virtual image, as well as power efficiency of the unit, device, or system.

Figure 2:
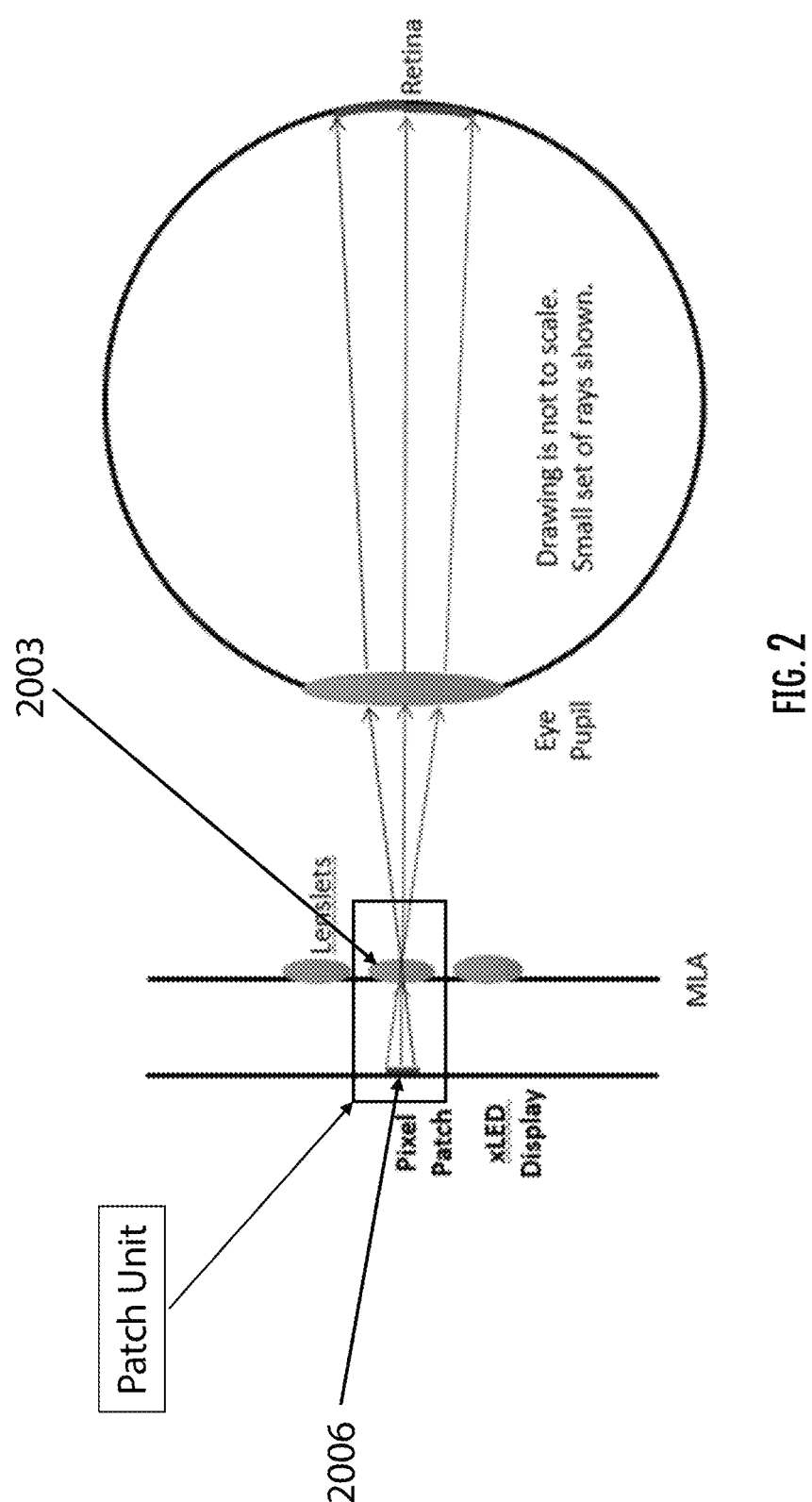
FIG. 2 is a schematic diagram showing a possible embodiment of the current invention showing a configuration of display, to lenslet(s), to pupil, to retina.
Figure 3:
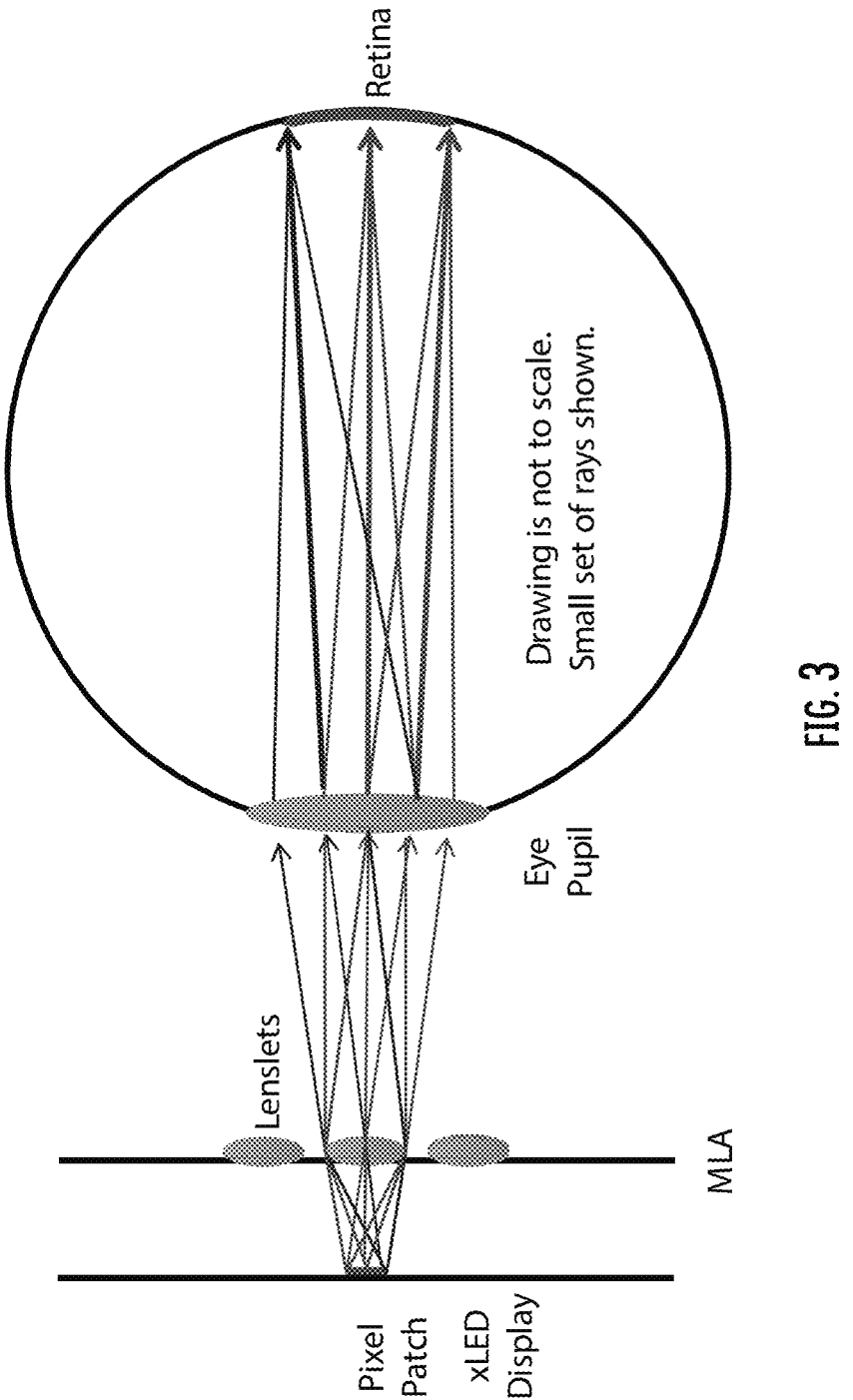
FIG. 3 is a schematic diagram showing a possible embodiment of the current invention showing a configuration of display, to lenslet(s), to pupil, to retina.

FIG. 2 and FIG. 3 (not drawn to scale) show the lenslet imaging a patch field (either pixels or a pattern of pixels) on the display or TOM to form a retinal image. The optics in these examples are operating at, in aspects, infinite conjugate so that the image(s) appear to be located at infinity. FIG. 2, in particular, shows the on-axis and chief rays/beams. And, in FIG. 2, lenslet 2003 optical power, focal length, or effective focal length sets the system magnification. So, for example, a pixel patch area 2006 appears magnified to the retina and the result is a sparse display. In aspects, by way of example, the TOM is capable of providing a magnification of around or about 7-10×.

FIG. 3, in particular, shows both chief and marginal rays/beams, wherein the lenslet defines the system aperture stop. The lenslet diameter will have an influence on the field size of the pixel patch that can be imaged. Therefore, the lenslet diameter is one of the trade variables in optimizing the optical design; more specifically, the optic design is determined by several parameters that may be varied depending on the importance of brightness, retinal resolution, TOM thickness, real world transparency, and so forth. These parameters include lenslet surface shape, lenslet diameter and focal length, and lenslet spacing. These are typically trades that are prioritized during the design optimization process. FIG. 3 also shows that the light spreads with increasing distance from the lenslet. (FIG. 3 includes a ray/beam trace showing greater detail of light emitted by pixel patch and transmitted to an eye.) In preferred embodiments, a separation distance exists between the eye and the TOM, referred to in some cases as eye relief, in a practical system. Therefore, vignetting and eyebox size will become considerations.

Figure 4:
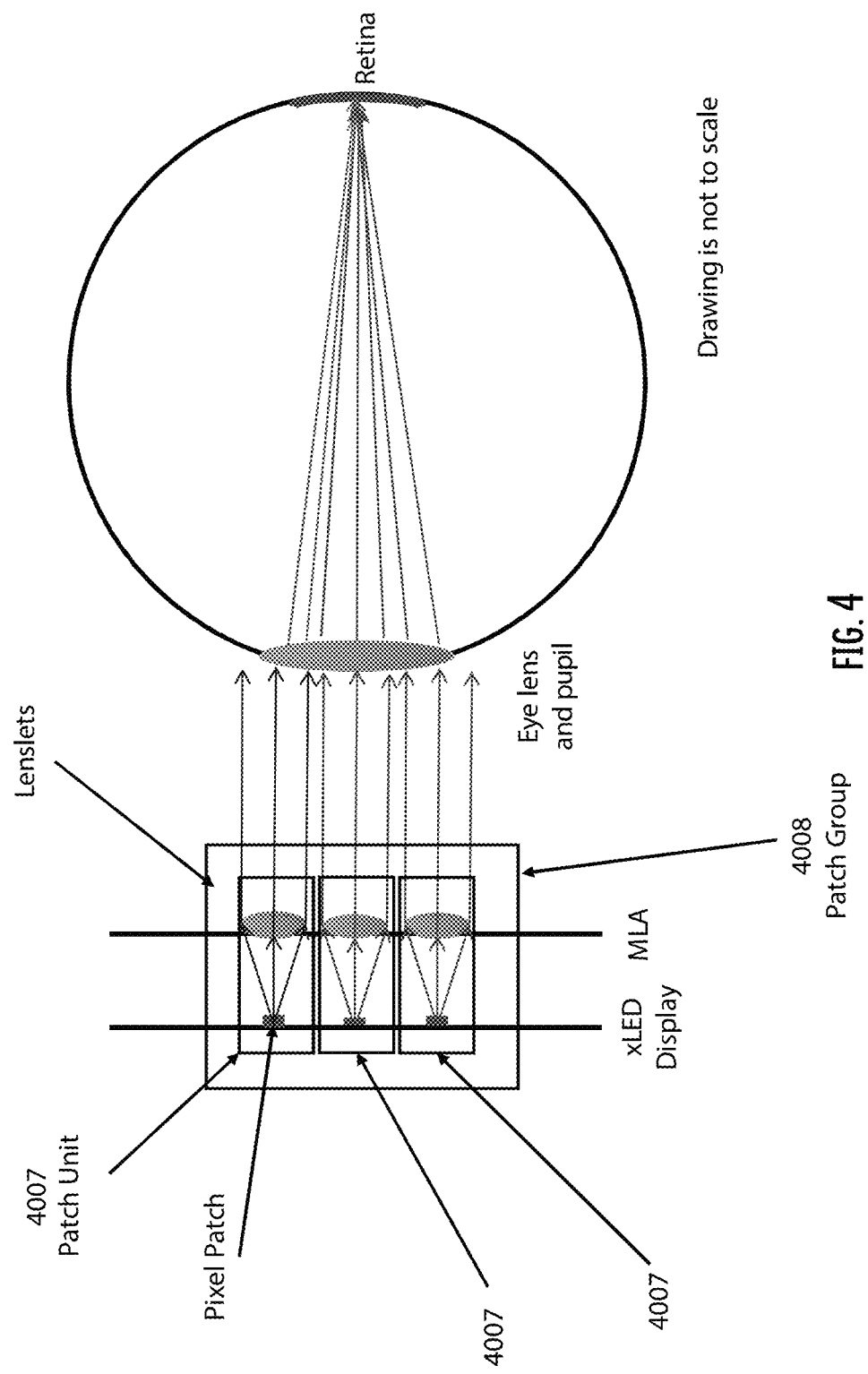
FIG. 4 is a schematic diagram showing a possible embodiment of the current invention showing a configuration of display, to lenslet(s), to pupil, to retina.

FIG. 4 shows multiple patch units (single patch unit 4007) in a patch group 4008 illuminating an area larger than the eye pupil. In aspects, when pixel light is focused by multiple lenslets and directed along a common angular trajectory, the pixels will be focused to the same retinal spot or portion. In this way, several patch images can overlay each other at the retina. This occurs in the TOM system because the lenslet aperture size is typically smaller than the eye pupil size, although in aspects it can be the same size as the eye pupil or larger. Patch units that produce this sub-image overlay are said to be part of the same patch group. The overlaid images enhance the perceived brightness to the wearer of, for example, a virtual image.

A human or animal eye pupil changes size depending on environmental light. For example, the human pupil size may be 2 to 4 mm in diameter in bright situations and 4 to 8 mm in darkness. In aspects, the current invention, such as the TOM, optical module, display, display elements, MLA, and/or MLA elements, are designed for bright or dark illumination circumstances. Further, in aspects, the TOM, optical module, display, display elements, MLA, or MLA elements, may be curved or have an arbitrary surface to match that of an optic, such as for eyeglasses, or for an eyeglass lens, or for a contact lens.

In embodiments, this results in a larger eyebox size, because, in aspects, these patch units produce the same retinal image. In aspects, a ratio of lenslet optical power to eye lens optical power determines the magnification of the display patch on the retina. As the magnification increases, ever smaller pixel sizes will be needed to produce a high-resolution image that avoids screen door effect. Regarding the "screen door effect," the pixel set typically includes non-emitting areas between pixels that provide electrical connectivity.

The eyebox is a region/volume where the eye can be positioned and is able to view the image or part of a larger image (e.g., subimage) relayed to the eye from the display or part of the display (e.g., patch unit), or a distant object by the optical system over the entire Field of View (FOV) for a typical pupil size and for the wide range of IPD (Inter Pupillary Distance). This region can include a depth toward and away from the system, and lateral movement or offset from side to side or above and below a specific position; in cases a preferred or ideal position. The movement may be due to head movement, eye movement, or both. A relatively large eyebox is desired so that the system conforms to the variation of eye position within the population when the system is mounted to the head/face of a user.

Figure 5:
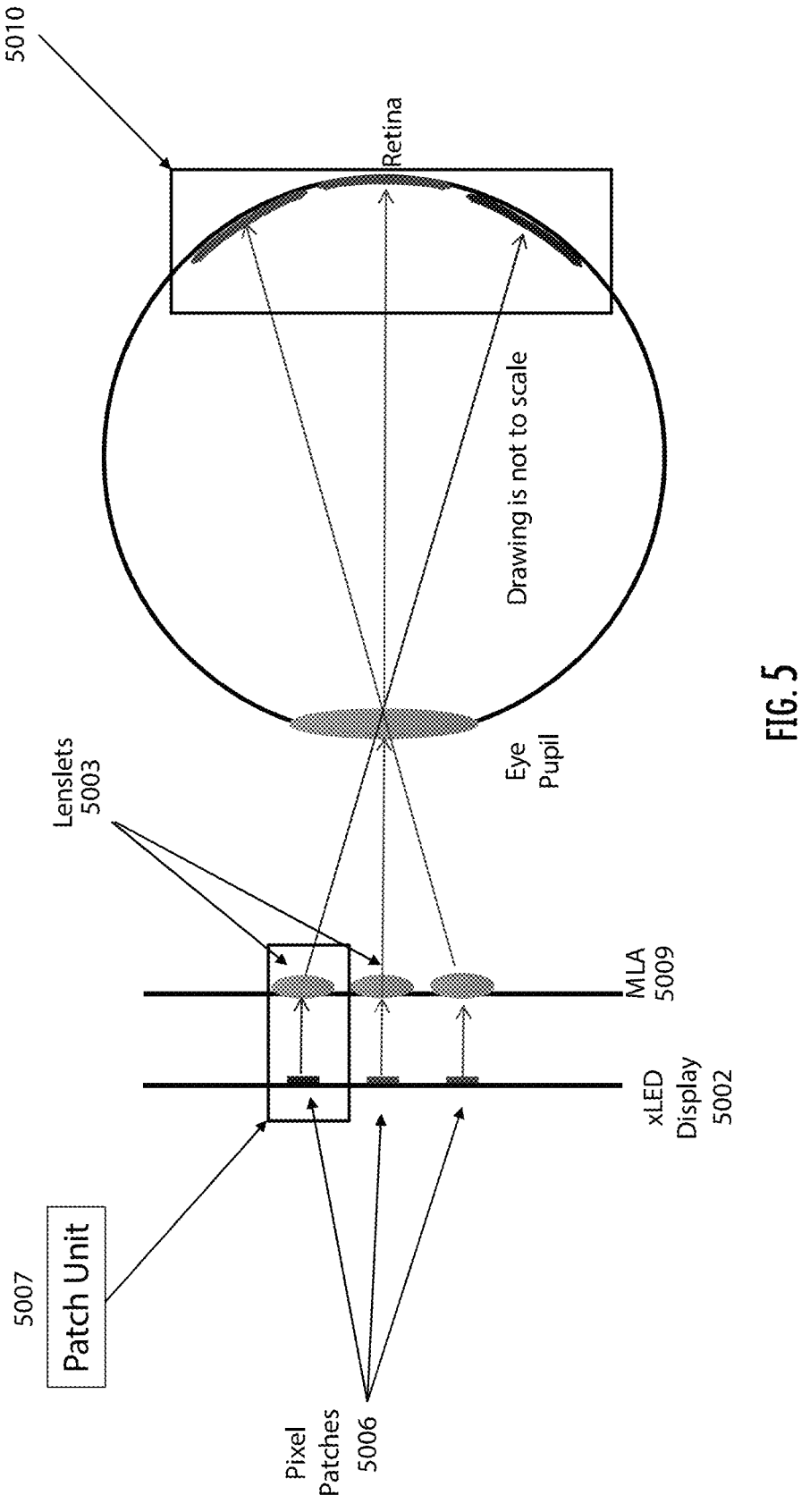
FIG. 5 is a schematic diagram showing a possible embodiment of the current invention showing a configuration of display, to lenslet(s), to pupil, to retina.

The term patch unit is sometimes used herein to define a pixel patch and the associated lenslet that are able to produce a retinal image. In embodiments, the display pixel patch 5006 and the lenslet 5003 exist on separate physical components; for example, an xLED display 5002 and an MLA 5009 as shown in FIG. 5, although it is possible to include the pixel patch and the lenslet on the same component. In embodiments, a TOM optical system will be composed of multiple patch units 5007 capable of operating independently of one another.

FIG. 5 illustrates how light from multiple lenslets/patch units are able to simultaneously pass through the eye pupil and share in producing, for example, a common image or parts of a common image on the retina. In this example, the optical axis of the patch unit is normal to the planar display and the lenslets have been set to collimate pixel light. Multiplicity is achieved because the lenslets 5003 have a diameter smaller than that of the eye pupil. The number of lenslets that are able to fill the eye pupil will depend on the relative size of eye pupil and lenslet, and the trajectory that the patch unit directs light. Accordingly, FIG. 5 shows multiple patch 5007 units forming a larger retinal image mosaic 5010, and it shows that it is also feasible to direct light from multiple patch units to form a mosaic at the retina producing a larger image. In aspects, each pixel patch or patch unit could contain a different subimage defined, for example, by external or internal processors. Further, in embodiments, the xLED display and the MLA would conform to a curved surface.

Figure 6:
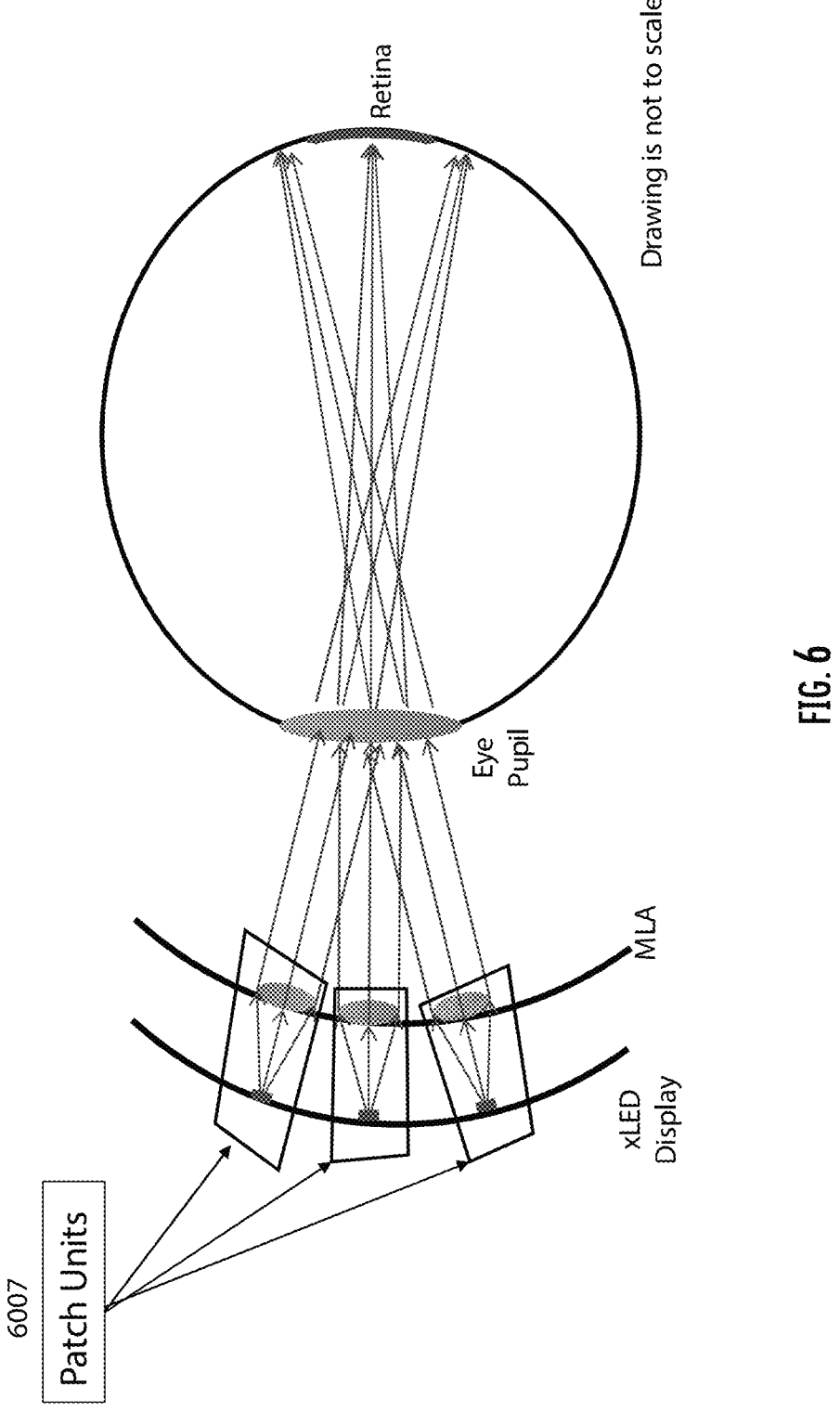
FIG. 6 is a schematic diagram showing a possible embodiment of the current invention showing a configuration of display, to lenslet(s), to pupil, to retina.

FIG. 6 shows patch units 6007 arranged on curved surfaces for both the display and the MLA. This configuration may be capable of leading to improved optical on-axis usage of the lenslets and the imaging performance. In this situation, the TOM will also conform to the shape of eyeglass optics to which it can be attached, connected, embedded, or associated.

1.1 Patch Group Architecture

The optical architecture, in aspects, comprises a lenslet imaging a display pixel or patch to a spot or portion on the retina. In aspects, the lenslet is able to image an extended field of view on the display composed of a patch of pixels that forms a sub-image on the retina. The display patch unit can be replicated in an array fashion using a sparse, mostly sparse, or partially sparse micro-display device and a micro-lenslet array to produce a larger composite retinal image. In aspects, the display pattern projected by a primary patch unit will differ from the others. Due to the short focal length of the lenslets in this example of the system, the display magnification is relatively large, ranging from about 5× to 10×, by way of example. Therefore the lateral distance between critical primary patch-lenslet sets (e.g., patch units) will be larger than the lenslet diameter.

Figure 7:
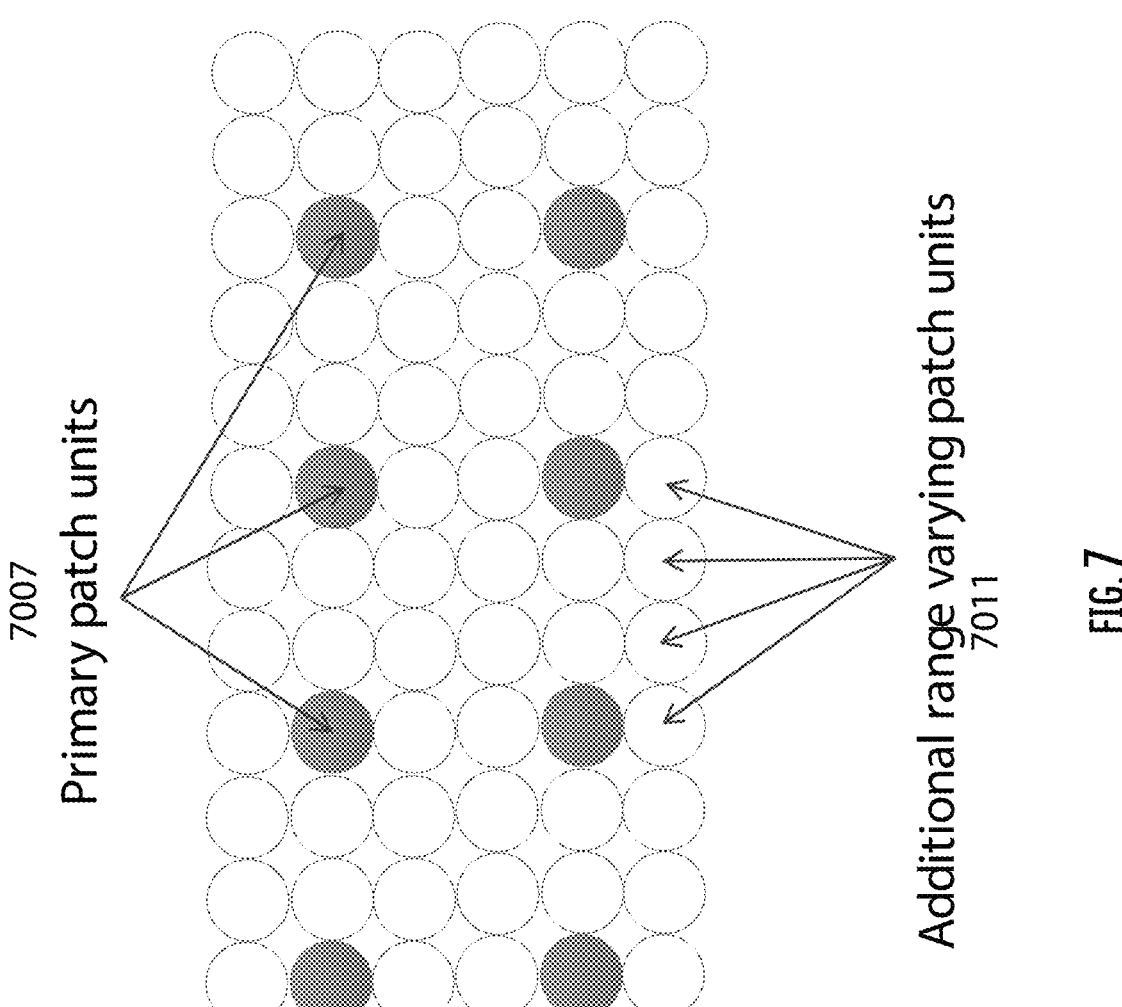
FIG. 7 is a schematic diagram showing patch units according to current invention.

FIG. 7 shows the top view of lenslets of a patch unit layout, wherein primary patch units 7007 are, in this example, the minimal necessary to produce the composite retinal image. The hollow circles represent additional lenslets 7011 that can be used for patch groups. This figure, as well as others shows how to create multiple range virtual image planes, virtual image focal planes, virtual distances, virtual depths, or combination thereof. Overlaid retinal sub-images are produced by the patch units, which provides advantages compared to currently existing display concepts. Due to the limited field of view of the lenslets, in examples, several patch units are needed to produce a larger mosaic image. However, the minimal set of patch units, in this example, is sparse. This is shown by the solid blue lenslet circles 7007 in FIG. 7. The intermediate area can be filled by extra patch units that provide additional functionality. These additional patch units are shown as hollow circles 7011 in FIG. 7. The additional units will create retinal sub-images that overlay each other, sometimes referred to as a patch group. If the optical power or effective focal length of additional lenslets are designed to vary slightly from each other, then respective sub-images appear to focus at different virtual image focal planes, virtual distances, or virtual depths, than other units. The actual patch unit size and patch group layout will depend on specified optical parameters, such as lenslet size, pixels per patch, eyebox size, use cases of the product with integrated TOM, etc.

Figure 21:
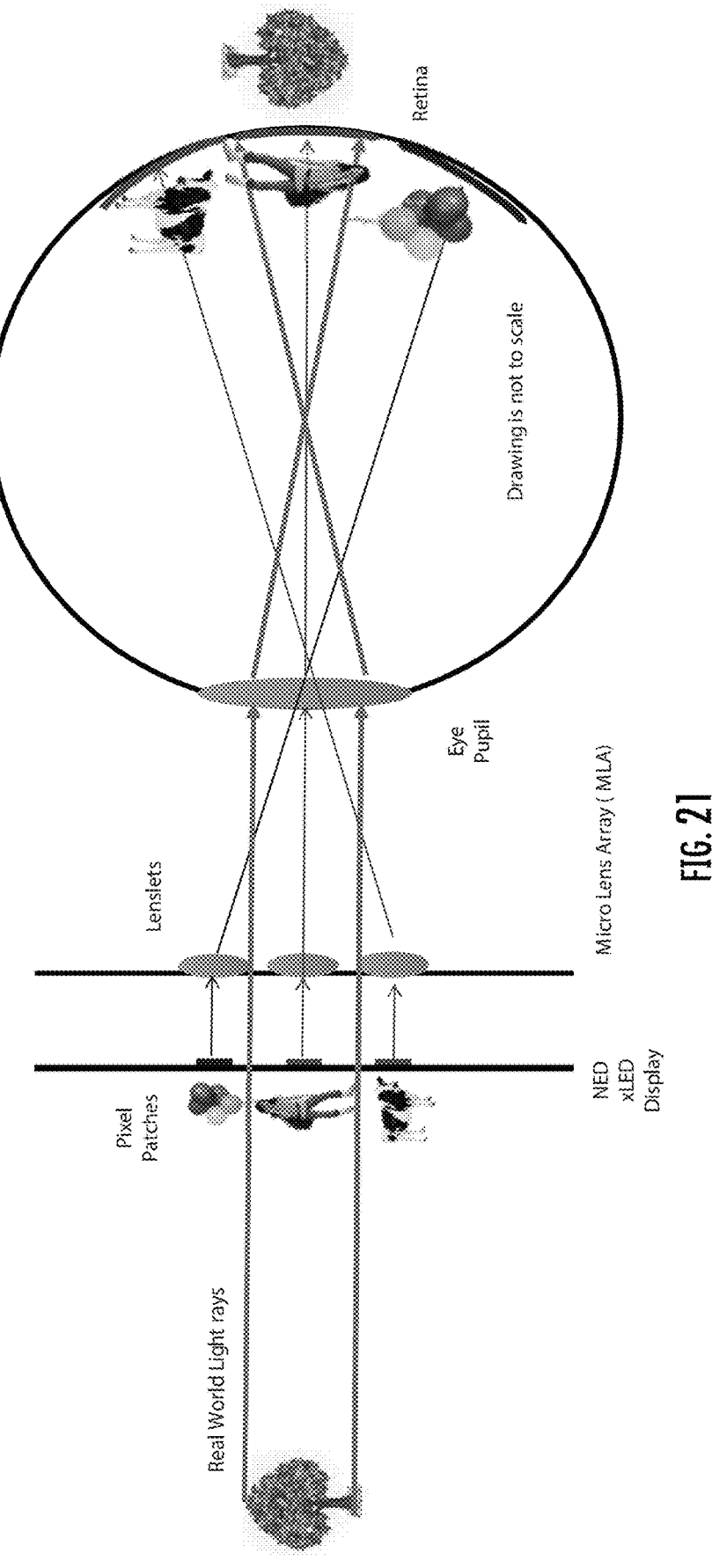
FIG. 21 is a schematic diagram showing a possible embodiment of the current invention, including showing components for forming a virtual image(s) as described herein and interaction with the retina of a virtual image(s) and a real world image(s), thereby creating, for example, augmented reality.

More specifically in FIG. 7, for this example, solid color circles 7007 represent the minimal set of primary patch units to create the composite retinal image and hollow circles 7011 are additional patch units inserted between primaries. In the case shown, the additional patch units produce multiple virtual focal image planes, distances, depths, or combinations thereof. Rather than leaving the space between patches empty, it is possible according to the current invention to insert more patch units in order to increase system functionality. These additional patch units (shown as hollow circles in FIG. 7) that project a common pattern to form like sub-images are sometimes referred to herein as "patch groups." Patch groups are able to increase the image brightness, increase the eye box size, vary in size as needed for resolution, dither the sub-images to smooth the image, and provide multiple virtual image plane focal distances. Assigning patch units into the space between primary patch units will reduce the sparseness of both the display and MLA and will thereby lead to reduced transparency for real world view light (see, e.g., FIG. 21). In embodiments, each patch group produces redundant images, therefore individual patch units comprising the group can be dispersed in locations over the display or have slightly varying features to provide unique functionality for the TOM. These options include:

Increased eyebox coverage (described in more detail in section 1.2.1);

Gaze dependent views (described in more detail in section 1.2.2);

Increased image brightness (described in more detail in section 1.2.3);

Enabling multiple virtual image focal planes, distances, depths, or combinations thereof (described in more detail in section 1.2.4);

Variation of aperture size supporting direct and peripheral gaze angles (described in more detail in section 1.2.5);

Color image production from monochrome patches (described in more detail in section 1.2.6); and Patch unit dithering to smooth screen door effect (described in more detail in section 1.2.7).

1.2.1 Patch Groups Used to Create a Larger Eye Box

The eyebox size is a system consideration since mounting an AR, MR, or virtual reality ("VR") unit should account for the variation of inter-pupil distance and eye position variation of the user population. Also, the eye pupil moves as the gaze shifts to an alternate angle. The eyebox is the volume that the eye can be located within and still view the full display. Eyeball rotation can move the pupil a few millimeters from its straightforward gaze position.

Since the eyebox for an individual patch unit is, in aspects, about the size of the lenslet diameter, a minor shift in the gaze angle would normally lead to partial or complete vignetting of the patch unit light. However, multiple patch units can be designed according to the current invention to produce similar overlapping retinal images no matter how they are arranged across the display device. Thus, the eyebox size can be increased by including multiple patch units in the architecture.

Figure 8:
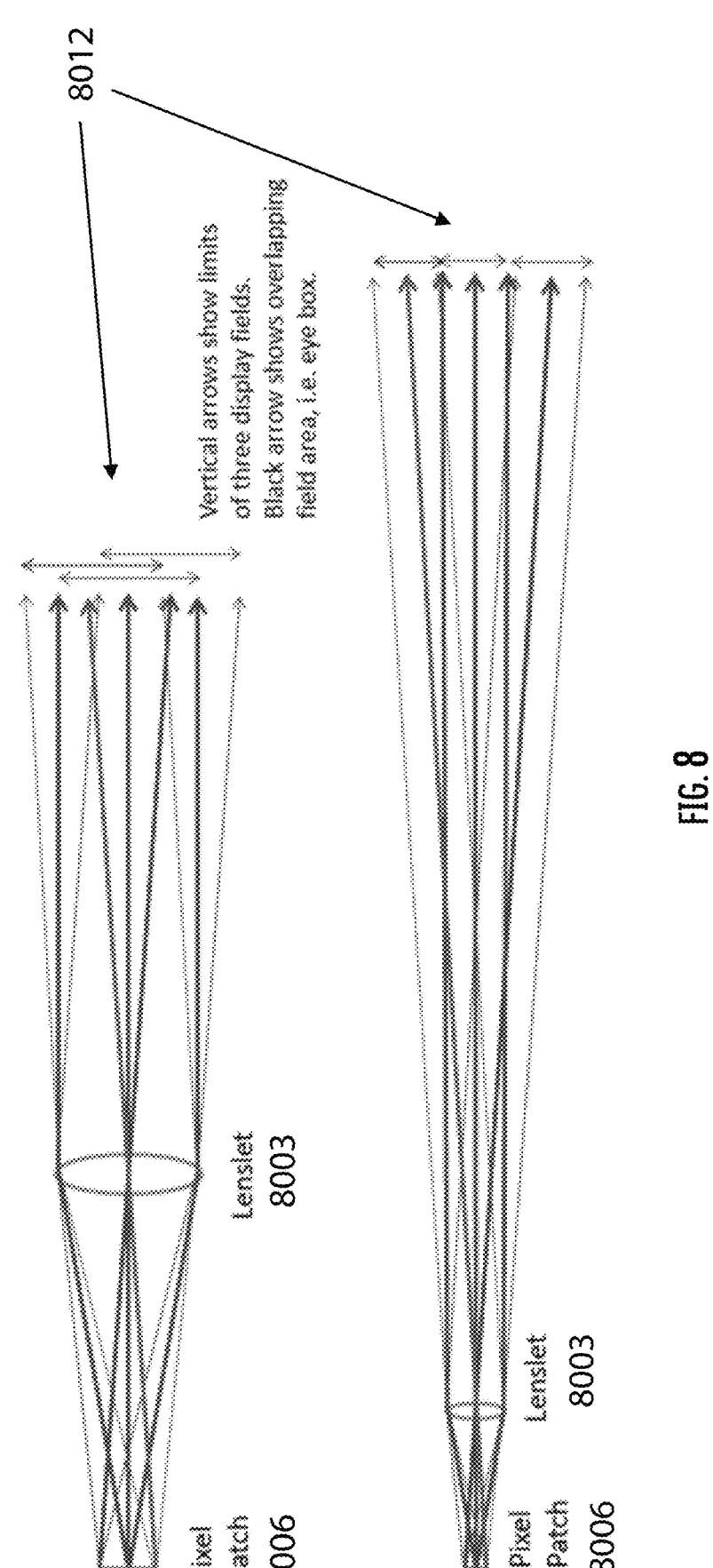
FIG. 8 is a schematic diagram showing possible embodiments of the current invention showing configurations of display, to lenslet(s), to pupil, to retina.

FIG. 8 shows light rays collimated into beams by a lenslet 8003 from the center and extreme pixels on a pixel patch. The arrows at the right 8012 of FIG. 8 show how the extent of the rays/beams diverge with distance from the lenslet. Eventually the divergence can become so large that the eye pupil may not capture all rays/beams leading to vignetting of the pixel patch. Thus, FIG. 8 effectively illustrates propagation of light rays emitted by patch pixels and focused into beams by a lenslet. This configuration focuses the light to appear to the eye as though the pixel patch is located at an infinite distance (infinite conjugate). The rays from each pixel in this case form constant diameter beams traveling away from the lenslet. As the beams propagate, they diverge from the center on-axis beam. The vertical arrows at the extreme right 8012 in FIG. 8 show how beams separate at a distance from the lenslet. If the lenslet were positioned just outside the eye pupil, and if the lenslet diameter were smaller than that of the pupil, then all the light would be captured and imaged by the eye. Such would be the case if the patch unit could be mounted within or near the location of a contact lens. However, in some cases, an eye relief distance will be needed so that the TOM module is clear of the region in the vicinity of the eye similar to the eye relief provided by eyeglasses. The TOM according to the present invention is designed to, in embodiments, be attached to, connected to, embedded in, or associated with an eyeglass optic and will thus be, in cases, about 15 to 25 mm from the front of the eye. Therefore the beams may diverge sufficiently that the pupil obscures a portion of the light. When this happens, the patch image appears vignetted, or cut off along an edge. Therefore eye relief will be a consideration in designing the layout of the patch groups to avoid, for example, vignetting.

Figure 9:
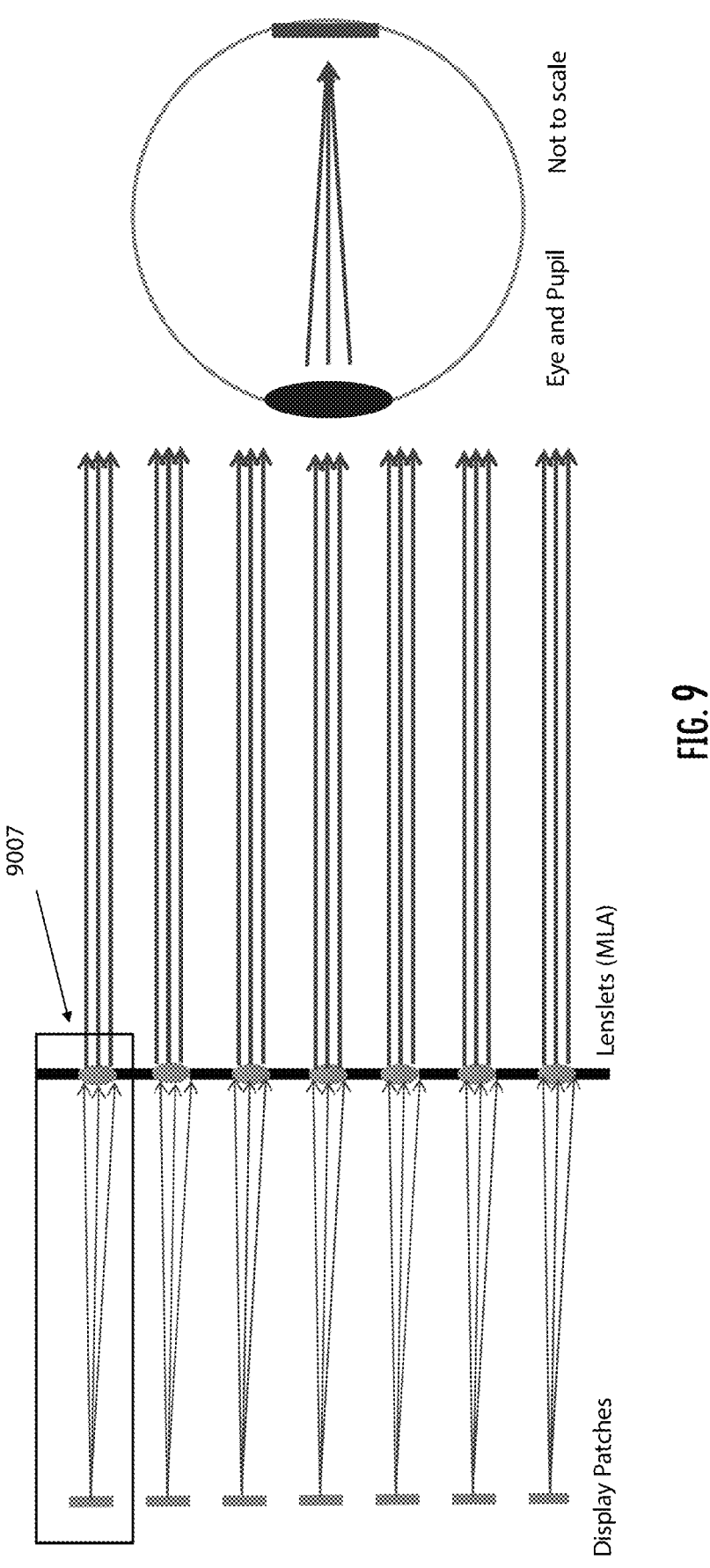
FIG. 9 is a schematic diagram showing a possible embodiment of the current invention showing a configuration of display, to lenslet(s), to pupil, to retina.
Figure 10:
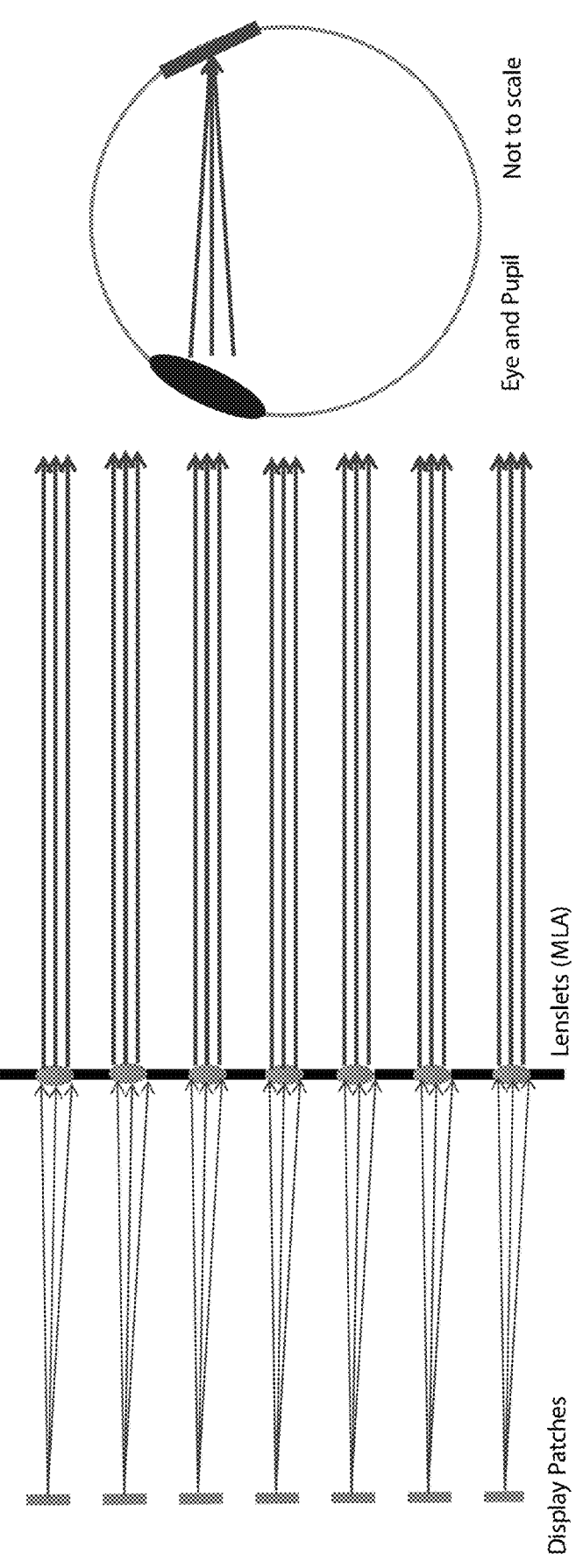
FIG. 10 is a schematic diagram showing a possible embodiment of the current invention showing a configuration of display, to lenslet(s), to pupil, to retina.

FIG. 9 shows a multitude of patch units 9007 used to illuminate a large region at the eye's distance, which is capable of creating a larger eyebox region. Only the central pixel rays and beams are shown here. FIG. 10 illustrates that when the eye's gaze shifts upward in the drawing (as compared to FIG. 9), the eye pupil is still able to view patch units that create, in cases, identical images. The patch image shifts away from the center of the retina's foveal region since it is no longer expected to be the straight-ahead view of the gaze (as in FIG. 9). The patch units do not have to be packed densely across the eyebox; however, there should be an adequate number being viewed simultaneously since the changing gaze angle will lead to patch unit vignetting and a changing number of overlapping images as the gaze shifts. Accordingly, as illustrated in FIGS. 9 and 10, shifting the eye gaze angle allows a common image to be viewed over a larger eyebox with similar patch units; therefore, the retinal image can differ depending on where the eye gazes, and, for example, if the eye is looking up or down, it can view an image that differs from a view looking in a different direction, and this concept can be extended to more views as the eye changes gaze direction. This change could lead to an image brightness variation with gaze if the number of patch units viewed is, for example, less than about 10. Note that a flat display configuration is shown. In this case the display patches are typically on the optic axis of the lenslet leading to optimal performance. When a curved display is used, the same eye box concept can still be used although the layout and lenslet prescription may be slightly different.

1.2.2 Gaze Dependent Views

Figure 11:
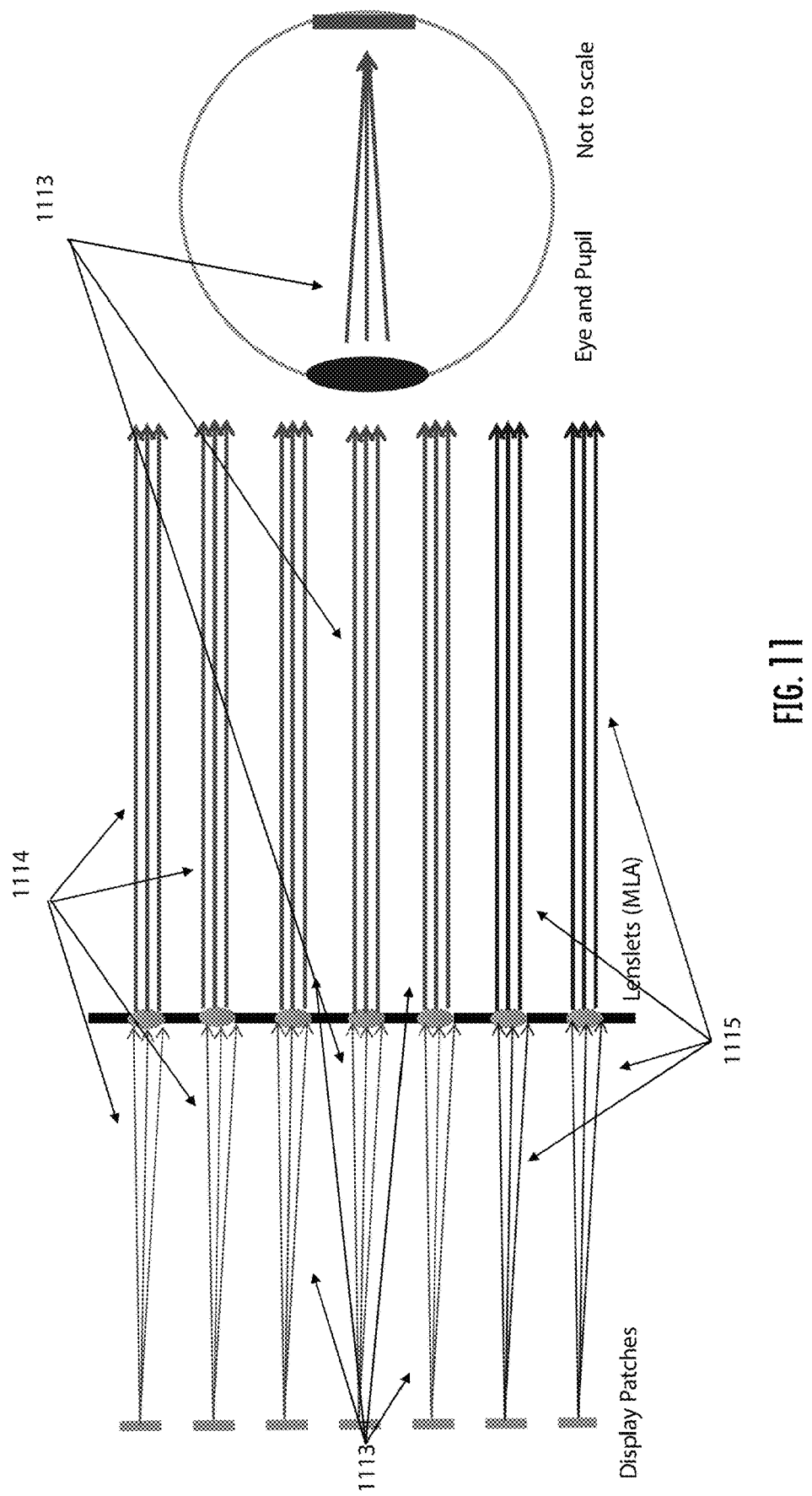
FIG. 11 is a schematic diagram showing a possible embodiment of the current invention showing a configuration of display, to lenslet(s), to pupil, to retina.

Reviewing the patch group or patch unit layouts in FIG. 9 and FIG. 10, it can be understood how it is possible according to the present invention to build a gaze dependent image. That is, when the wearer's eye looks up or down (or left and right), it is possible for the TOM described herein to provide distinctly different views or images. This is shown in FIG. 11, for example. Here, the red 1113, green 1114, and blue 1115 arrows indicate that pixel patches, patch groups, and/or patch units are transmitting different images that the eye's pupil will intercept in the eyebox. The figure shows only the collimated light from the center patch pixel. The actual patch cone of rays/beams for a patch unit will be spread over a larger area, in aspects. Therefore the gaze dependent views will change and blend in the transition region between patch units. An application might use this gaze dependent technique to provide an alert in the straight ahead view that directs the user to glance to the periphery to obtain display data that might otherwise obscure the critical direct ahead view. Accordingly, varying the pattern across a patch group can lead to gaze dependent viewing, and here, as shown in FIG. 11, the upper and lower gaze images (or, e.g., left and right and/or diagonal) will differ from that of the center gaze. Since the pixel patch and/or patch unit image varies according to location, the retinal image differs depending on where the eye gazes.

1.2.3 Promoting Increased Brightness

When the retinal images from two or more patch units are aligned, the perceived image brightness increases. This is a consideration when the xLED display provides limited illumination power and the TOM system is used in a bright outdoor environment. The patch units can be concentrated in close proximity to each other on the display to promote the increased brightness.

Figure 20:
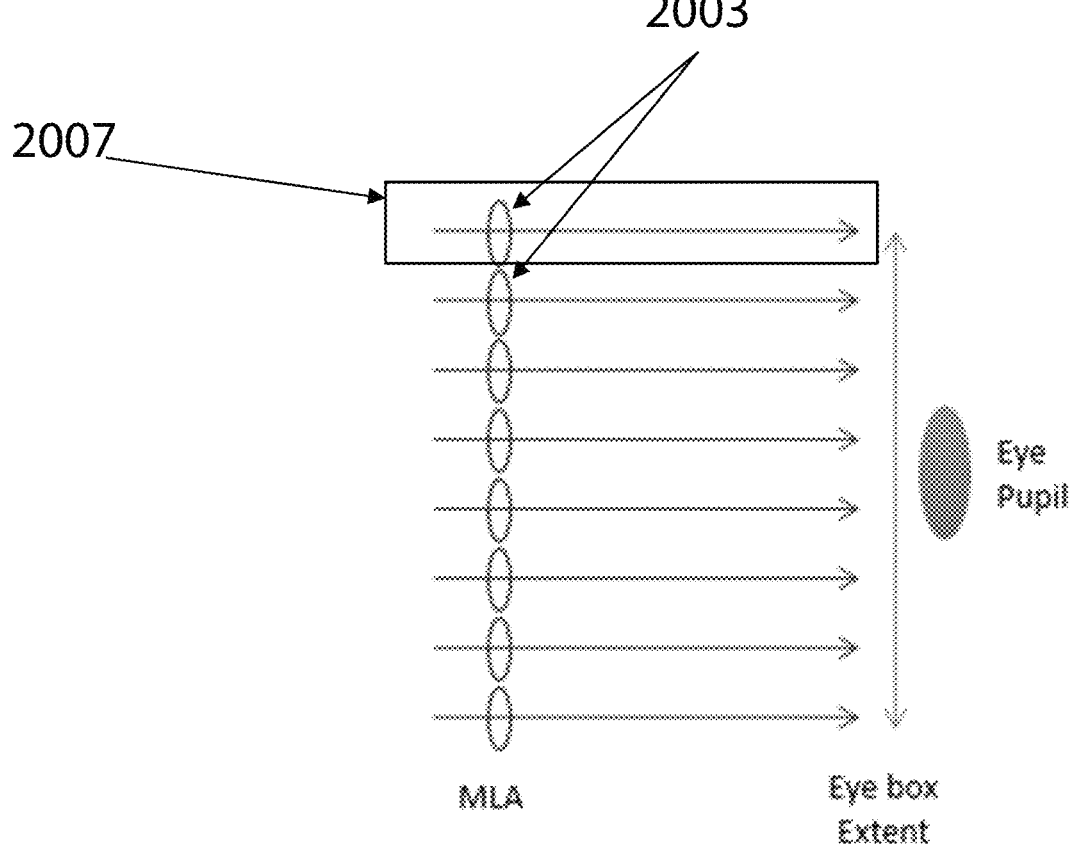
FIG. 20 is a schematic diagram showing a possible brightness enhancing embodiment of the current invention.

FIG. 20 shows a set of patch units that similarly direct light through the pupil to produce overlaid images that increase the apparent brightness of the retinal image. The figure shows multiple lenslets 2003 in an MLA directing light equivalently over an area larger than that of the eye pupil. This configuration increases the size of the eyebox, too. For increased brightness, the patch units of a patch group may be concentrated together. For a greater eyebox size, the patch units can be distributed more sparsely.

1.2.4 Producing Multiple Focal Planes

In some cases, the system uses a fixed focal length for all MLA lenslets and a fixed display to MLA separation to produce an image the eye interprets as being located at a common focal distance from the user. This common virtual focal plane might appear to be located at infinity or at a closer location such as 6 feet distance depending on the lens optical design.

Figure 12:
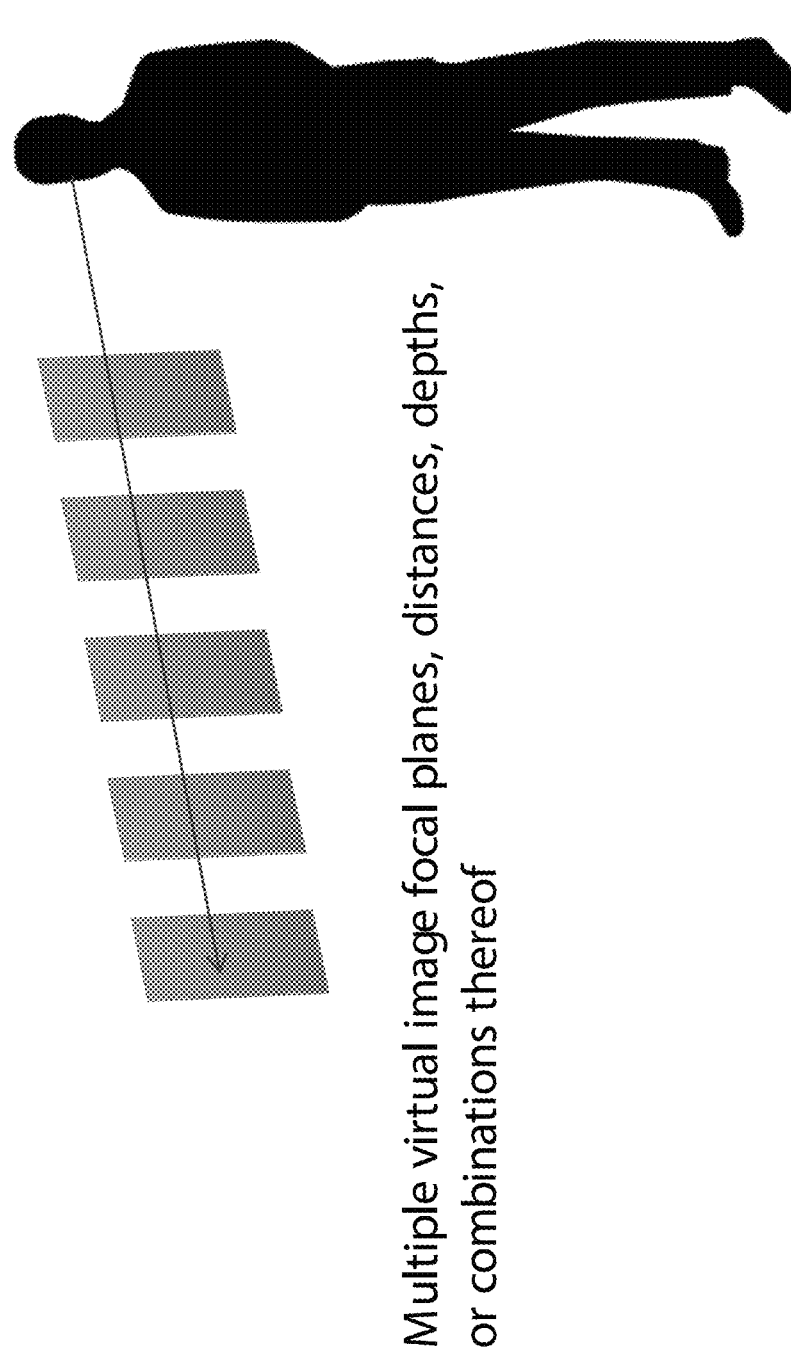
FIG. 12 is an illustration showing a possible embodiment according to current invention wherein a wearer of the device/system sees virtual images in multiple focal planes.

However, it would be further desirable to adjust the display virtual image to appear at a focal distance consistent with real world objects in the viewer's scene of view. In addition, for binocular systems, the difference between focus accommodation and eye convergence can lead to fatigue or more severe eye strain symptoms during extended wear if not corrected. This multitude of virtual image focal planes, distances, depths, or combinations thereof, is illustrated in FIG. 12, wherein a wearer's perception of multiple virtual image focal planes, distances, depths, or combinations thereof, may be produced via TOM patch groups and/or patch units. FIG. 12 shows, in part, individually illuminated virtual image planes as viewed by a user. In aspects, software applications will generate the display image for each virtual image focal plane, distance, or depth, and the mechanism is described in greater detail in the explanation of FIG. 13 and FIG. 14 herein. The multi-virtual image focal plane range may have a greater impact for binocular systems where eye convergence and accommodation, if not matched, can lead to viewer fatigue.

The apparent virtual image focal plane could be adjusted if the display-to-lenslet separation could be mechanically varied; however, in cases, this would introduce undesirable complexity into the system and an avenue for potential system failures. The TOM system according to the present invention is able to address this need for multiple virtual image focal planes by varying virtual display focal power or effective focal length among the lenslets, and in cases the lenslets within a patch group.

Figure 13:
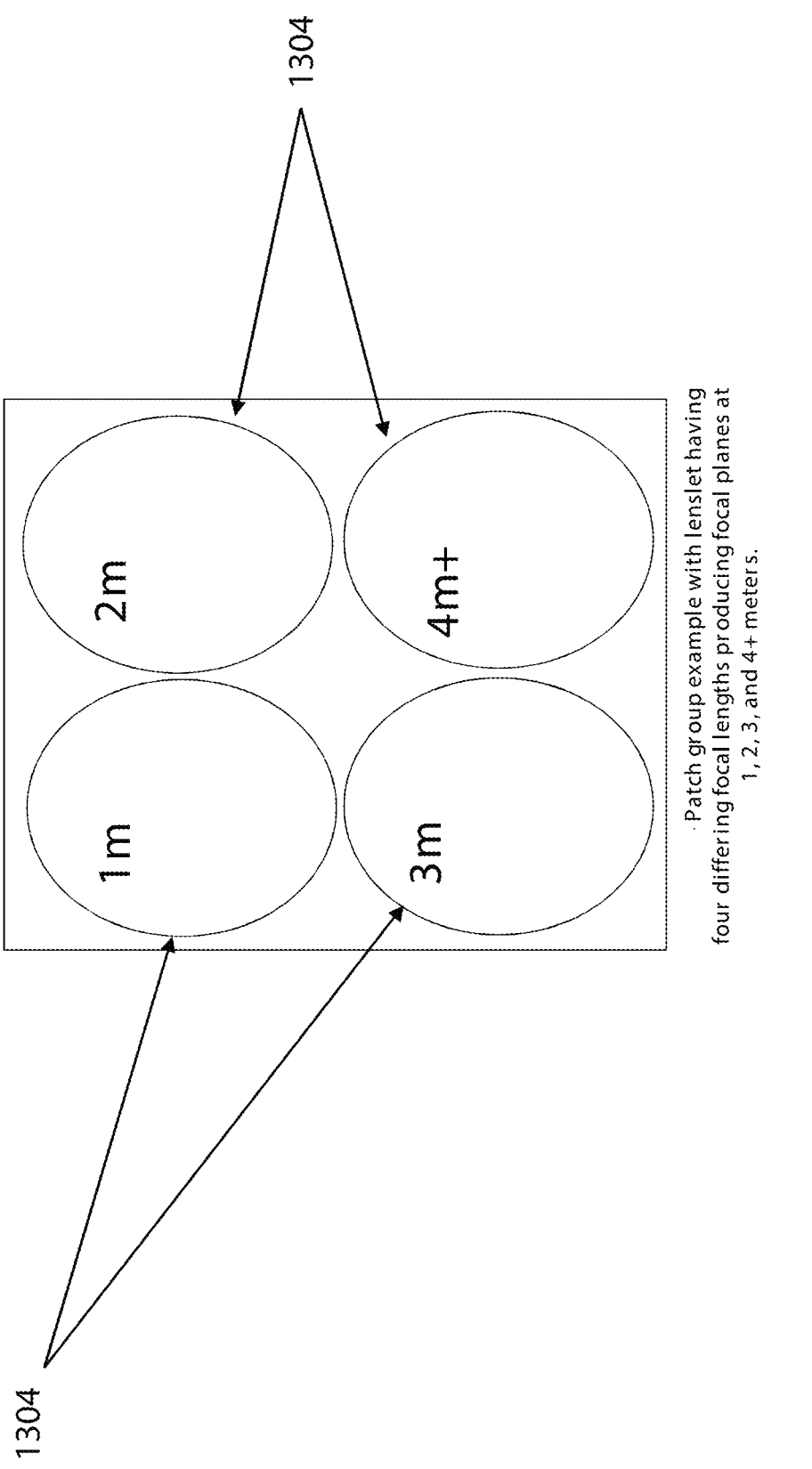
FIG. 13 is a schematic diagram showing a possible embodiment of the current invention showing a patch group with a lenslet having four differing focal lengths producing differing focal planes.

Generally, two or more patch units of a patch group are simultaneously able to project light through the eye pupil. As an example, FIG. 13 shows a patch group composed of a 2×2 array of patch unit lenslets. The numbers on the Figure lenslets identify the focal plane distances of 1, 2, 3, and 4+ meters. The most distant focal plane will be designed to the eye's hyperfocal distance, thereby accommodating an infinite distance plane, for example. The number of focal planes can be determined by application specifications and limited by the number of patch units that fill the space available for a patch group. The value of the optical power or effective focal length between the focal lengths may vary by less than 1%, so the lenslets are virtually identical, in aspects. A custom MLA, in cases, may need to be designed and fabricated with the lens form varying across the component, which would be understood by one of ordinary skill in the art.

More specifically, in FIG. 13, the illustration shows an example of a patch group lenslet set inside an MLA composed of an array of 2×2 lenslets 1304. Each lenslet has a slightly different optical power or effective focal length. The lenslet labels indicate optical designs that produce a 1 meter, 2 meter, 3 meter, and infinite distance or depth virtual image focal plane. The number of lenslets in the patch group lenslet set can be larger than 2×2. The overall size of the patch group should preferably not be larger than the dimensions of the eye pupil size. For example, if the eye pupil diameter is 4 mm, and a lenslet pitch is 600 microns, the number of embedded lenslets is $\sqrt{2}*4/(0.6)=9.4$, which supports a 9×9 lenslet patch group set. However, lenslets can also serve functions other than producing virtual image planes, since this many display planes may be larger than needed.

Figure 14:
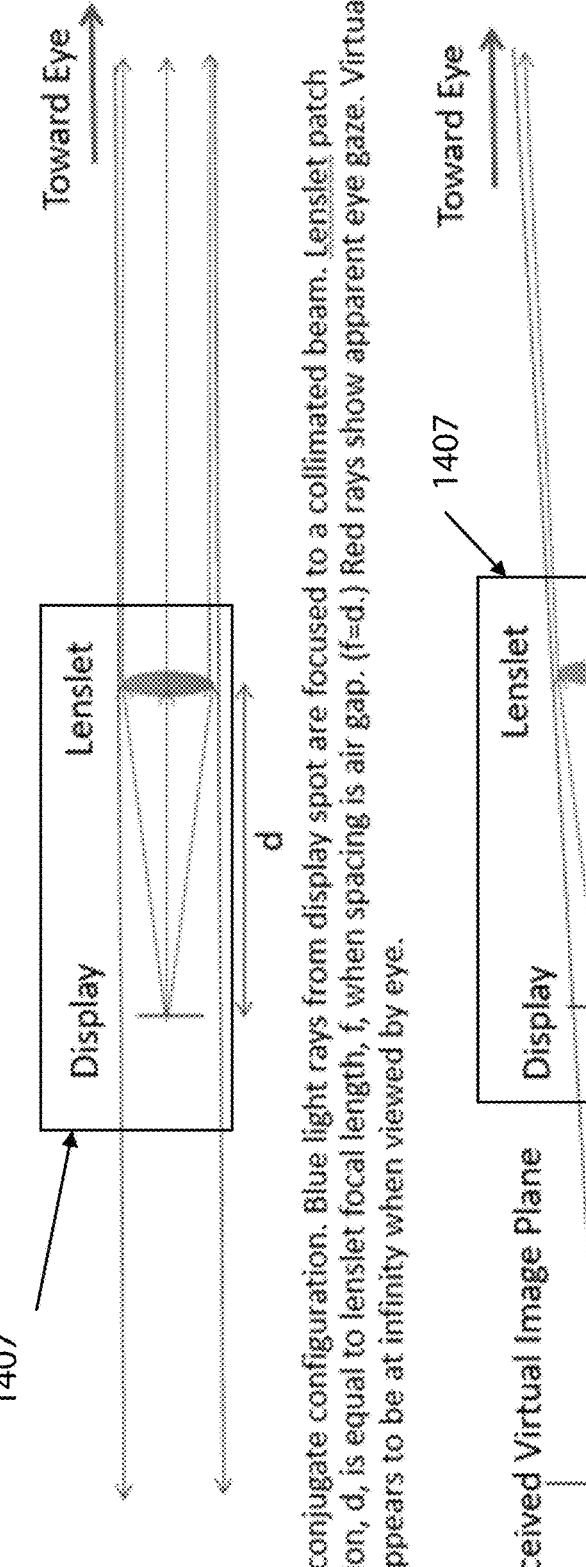
FIG. 14 is a schematic diagram showing a possible embodiment of the current invention showing a configuration of display, to lenslet(s), to eye.

The ability to present a virtual image focal plane, distance, or depth is illustrated in FIG. 14, which shows light ray/beam traces of two patch unit 1407 configurations. At the top of FIG. 14, the lenslet and pixel patch (patch unit 1407) are set to operate at infinite conjugate. The virtual image plane appears to be at infinity. (Infinite conjugate configuration—Blue light rays from display spot are focused to a collimated beam. Lenslet patch separation, d, is equal to lenslet focal length, f, when spacing is air gap. (f=d.) Red rays show apparent eye gaze. Virtual image appears to be at infinity when viewed by eye.)

At the bottom of FIG. 14, the lenslet optical power or effective focal length is higher, greater, or longer, so the rays/beams appear to emit from a closer virtual image focal plane. (Finite conjugate configuration—Optical or focal power is less than that of lenslet in infinite conjugate configuration. Effective focal length is longer than infinite conjugate case. (f>d.) Red rays show apparent eye gaze. Virtual image plane appears to be at a distance closer than infinity when viewed by eye. Difference in optical power or effective focal length may be small/minor.) The two patch units 1407 may be similar except that the bottom configuration has a weaker effective focal length lenslet, so that the rays/beams seem to diverge from a virtual image point making it appear that the imaged pixel location is at a focal plane closer than infinity. Thus, by varying lenslet optical powers or effective focal lengths across the MLA, a variety of virtual image focal planes, distances, depths, or combinations thereof, can be produced.

The presentation of a particular virtual image focal plane, distance, or depth to the user can be managed by system electronics. For example, when a single focal plane is desired, then only one specific pixel patch of a patch group will be powered to illuminate. If a virtual image(s) is composed of multiple focal planes, then multiple patches will be illuminated and the electronic processing engine will determine the appropriate pixel sets to light on each patch unit so that the retinal image does not contain confusing overlap. The processor will also account for the variation in magnification between patch units (e.g., due to varying optical powers or effective focal lengths of relevant lenslets). It may also, in cases, be necessary to include eye tracking hardware and software to determine the user gaze. In aspects, one or more processors and/or accompanying software or applications will determine the necessary optical power or effective focal length of one or more lenslets in order to implement the effect described above wherein intentionally changing or choosing the optical power or effective focal length of one or more lenslets creates a perception that virtual images are at varying focal distances, planes, or depths as perceived by a person wearing the TOM. For example, a processor may determine that a virtual image should appear at a certain distance from a user and activate patch units and/or patch groups having lenslet optical power or effective focal length suitable to make the virtual image appear at the desired distance from the user (or, in aspects, instruct relevant lenslet(s) to change optical power or effective focal length to make the image appear at the desired distance from a user). The optical power or effective focal length to achieve the desired perception will be set by the one or more processors and the settings or ranges can be predetermined or determined by the one or more processors dynamically depending on circumstances such as the virtual image size or shape, the real world input, movement, visual cues, brightness, the desired distance, other real world or virtual objects, and other factors.

FIG. 22 shows a possible embodiment of a method one or more processors might take to allow the TOM to allow for creation of the perception by the user that virtual images are at different distances from a user or take up different space in a real and/or virtual environment. For example, the processor may identify the virtual image or what distance a virtual image should appear from a user whether in real or virtual space and depending on where the user and where the virtual image/object are in space 2201. The processor can activate a particular patch unit or patch group having a lenslet(s) with an optical power or effective focal length preferable for creating an image at the desired perceived distance (or, in aspects, a lenslet can be modified to create the perception of distance) 2202. Thus, the processor can determine the optical power or effective focal length that the lenslet should be (or change to be) in order to make the virtual image/object appear at the desired distance 2202. The processor will activate a chosen patch unit(s) and/or patch group(s) having a lenslet(s) with an optical power or effective focal length to achieve the perception of the desired distance of the virtual image/object 2203. In other aspects, the processor will instruct the relevant lenslet or lenslets to change optical power or effective focal length as decided by the processor that is appropriate to achieve the perception of the desired distance of the virtual image/object 2203. The processor is capable of dynamically communicating internally and with elements on the TOM so that different virtual images that the processor determines should be at different distances from the user can appear to be located in space at different or multiple virtual image focal planes, distances, or depths in space or relative to one another 2204. Moreover, as the user moves in space or the virtual images are moving and distances between user and virtual images are changing, the processor is capable of recognizing these changes and dynamically carrying out the method so that chosen patch units and/or patch groups having lenslets with preferred optical power or effective focal lengths will be activated (or, in aspects, so that lenslet(s)' optical powers or effective focal lengths are capable of changing) as the user moves in space or the virtual images move. This will create the perception to the user, for example, that as the user moves towards a virtual image, the virtual image/object is getting closer to the user. As the user moves farther and closer to virtual images, the processor will account for changing desired distances and activate different patch units or patch groups (or instruct lenslets to change) and account accordingly so that from the perspective of the user he/she is moving around in space or objects are moving around in a virtual or real world environment 2205. Moreover, because the lenslets, groups of lenslets, patch units, and patch groups are capable of operating independently, one virtual image can appear at one distance and another virtual image can appear at a different distance. Accordingly, the perceived distance of the virtual images from the user (or relative to one another) can change, and the processor can account for the perception of these virtual images in space as they or the user move by changing which patch units or patch groups are activated (or by changing lenslet(s) optical power or effective focal length) in real-time or near-real-time, in embodiments, to create perception of movement and varying changes in distance and perspective, including the appearance of different virtual images at different distances from the user.

In embodiments, the system is capable of creating the perception of a three-dimensional object in space by simultaneously activating multiple patch units having different lenslet optical powers or effective focal lengths to create a 3D virtual image. By way of example, patch units having an optical power or effective focal length to make parts of the object appear closer to the TOM will activate simultaneously as different patch units having different optical powers or effective focal lengths to make parts of the same object appear farther from the TOM. In other words, several virtual image focal planes, depths, or distances can be viewed or perceived simultaneously to produce the appearance of a 3D object to the user. Therefore, in embodiments having static lenslets, multiple patch units will be on or activated to create the virtual 3D view. Further, for the static case, this means, in aspects, multiple spatially diverse patch units are operating. For a TOM with dynamic/active lenslets according to the current invention, in aspects, the choice of differing virtual image focal planes can be made during the time sequence of the view. In aspects, one or more processors can power the determination of where objects or parts of objects should appear in space, which lenslet optical power(s) or effective focal length(s) is suitable or preferable to create the 3D perception of different distances/locations, which patch units should be activated to create the perception of 3D depending in cases on the lenslet optical power or effective focal length of those patch units, or in cases of dynamic/ active MLAs changing optical powers or effective focal lengths of particular lenslets. For both static and dynamic/ active MLAs, the processor can make the determinations and activate or change the properties in real-time or near-real-time so that the viewer perceives that the viewer is moving in 3D space or that objects are moving in 3D space.

In embodiments, once the processor or system reaches step 2205 of FIG. 22, the process repeats itself by starting back at step 2201. In aspects, depending on the needs of the system, the processor is capable of skipping steps, repeating steps, going back to prior steps, going ahead to later steps, or otherwise acting dynamically.

1.2.5 Variation of Aperture Size to Support Direct and Peripheral Gaze Angles

The lenslet diameter will influence retinal image resolution and the size of the pixel field that can be reasonably imaged. In general, the system will preferably have high resolution in the eye's foveal region, which leads to large aperture lenslets to support this. However, in aspects, peripheral images can be lower resolution and thus use smaller lenslets that may need to be used off-axis. Therefore, the MLA can be composed of multiple aperture size lenslets. In this manner, patch units supporting the concept of a patch group will be distributed across a relatively large region of the MLA.

Figure 15:
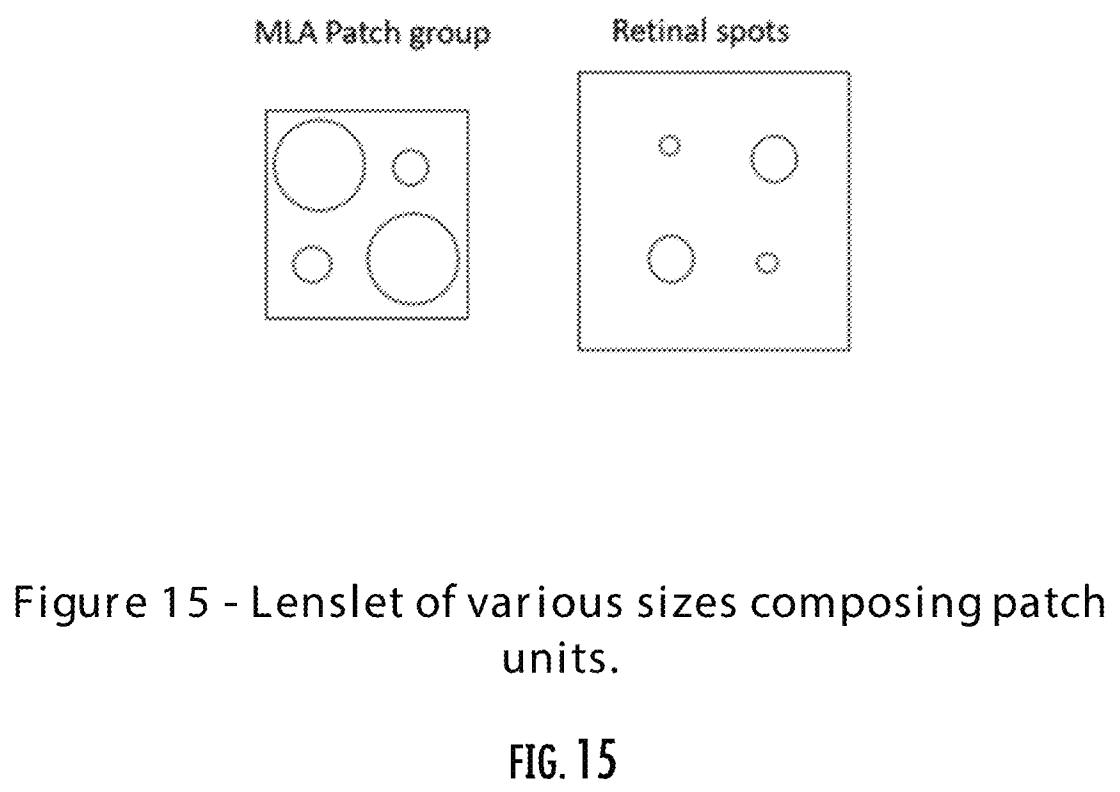

For example, in particular layout embodiments, lenslets that support a direct gaze angle would have the largest apertures and would generally be located near the center gaze angle of the MLA. Peripheral gaze lenslets could have less, such as one half to one quarter the aperture diameter of the lenslets supporting direct gaze angle, and they could be interspersed among other lenslets as shown in FIG. 15. In the pictured region of the MLA, there are large lenslets supporting direct gaze imaging, with interspersed small lenslets supporting peripheral gaze angles. In examples, MLA fabrication could accommodate various lens forms and sizes across the array.

More specifically, in FIG. 15, variation of aperture size may influence image resolution and FOV. In embodiments, direct gaze patch units should have high resolution, large aperture lenslets. In embodiments, peripheral gaze patch units can have lower resolution, smaller aperture lenslets. Generally small aperture lenslets (large F #'s) will have a larger display field, but the size of the diffraction limited spot will be greater. Small aperture lenses produce less spot aberration typically. Larger diameter lenslets (smaller F #'s) will have more aberrations and a smaller display field. They will produce high resolution spots, but may require aspheric designs. The larger lenslets also couple more light to the retina and will produce brighter sub-images.

1.2.6 Composite Color Production Using Monochrome Display Patches

Current xLED displays typically have composite pixels composed of red, green, blue, and possibly white subpixels. When the display is viewed directly by the eye or through a low magnification objective lens, the subpixels blend together without noticeable visual effect. However, in some examples, a TOM presents a high magnification image of the pixel patch, so when the sub-pixel size is sufficiently large (>5 microns) the foveal region of the eye may resolve each sub-pixel and the black space between them. This may lead in some cases to a screen door effect and the colors may not desirably blend.

For this reason, in aspects, it may be beneficial to use monochrome pixel patches to achieve desirable resolution and blend multiple patch unit images to produce the color effect. The perceived color is due to retinal image overlay from monochrome patches in a patch group. A suitable number of patch units should be used that are simultaneously viewed so that the color does not shift during eye gaze movement.

Figure 16:
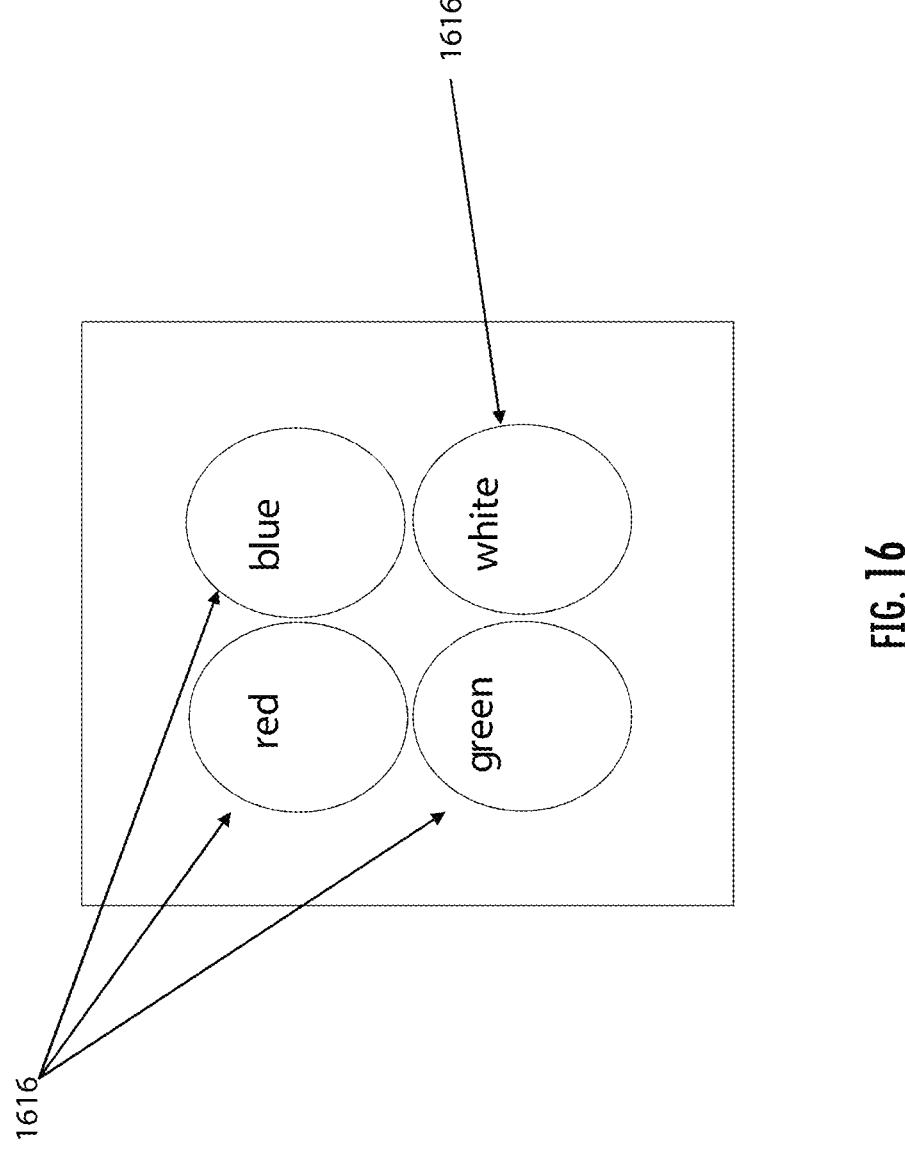
FIG. 16 is a schematic diagram showing a possible embodiment of the current invention illustrating possibility of color production via monochrome xLED areas.

FIG. 16 illustrates color production via monochrome xLED areas 1616 when monochrome patches are simpler or less expensive to manufacture and will still support the TOM device and system disclosed herein. In cases, when pixels are composed of multiple color sub-pixels, the overall resolution may be less. Collecting monochrome subpixels into a single patch 1616 and then overlaying three or more patches can produce a color image with higher resolution in this case. This technique may be used if, for example, producing sets of color pixels is more difficult or expensive than producing monochrome sets. Note that, in particular aspects, the pixels could also be white, and the lenslet could carry a color filter. This, however, in cases, may be a less efficient use of the light.

1.2.7 Dithering

The patch units of a patch group can be varied so that there is a subpixel size offset between the various overlapping retinal images. This technique can be used to smooth a screen door effect (or in cases color banding) making the resulting image, in aspects, more pleasant to view for the user. The technique also allows the perceived image to appear to have a smoother, higher resolution appearance.

According to the current invention, the dithering technique is produced using sets of patch units that are concentrated in location so that they simultaneously or nearly simultaneously image onto the retina. In aspects, pixel layout on the microdisplay may be fixed, therefore the layout of the MLA may be chosen for customization. In other aspects, the pixel layout and/or MLA may allow for custom configurations. The center-to-center pitch of the lenslet may be set so that it is not equal to an integral number of pixels, and, in aspects, the offset from the integer multiple may be set to a fraction of a pixel. For example, if the pixel pitch is 10 microns, the lenslet center-to-center pitch between a lenslet and its three neighbors in a 2×2 dithering formation could be about 105 microns along each dimension. In a 3×3 dithering situation, a 103.3 micron offset might be selected, for example.

Figure 17:
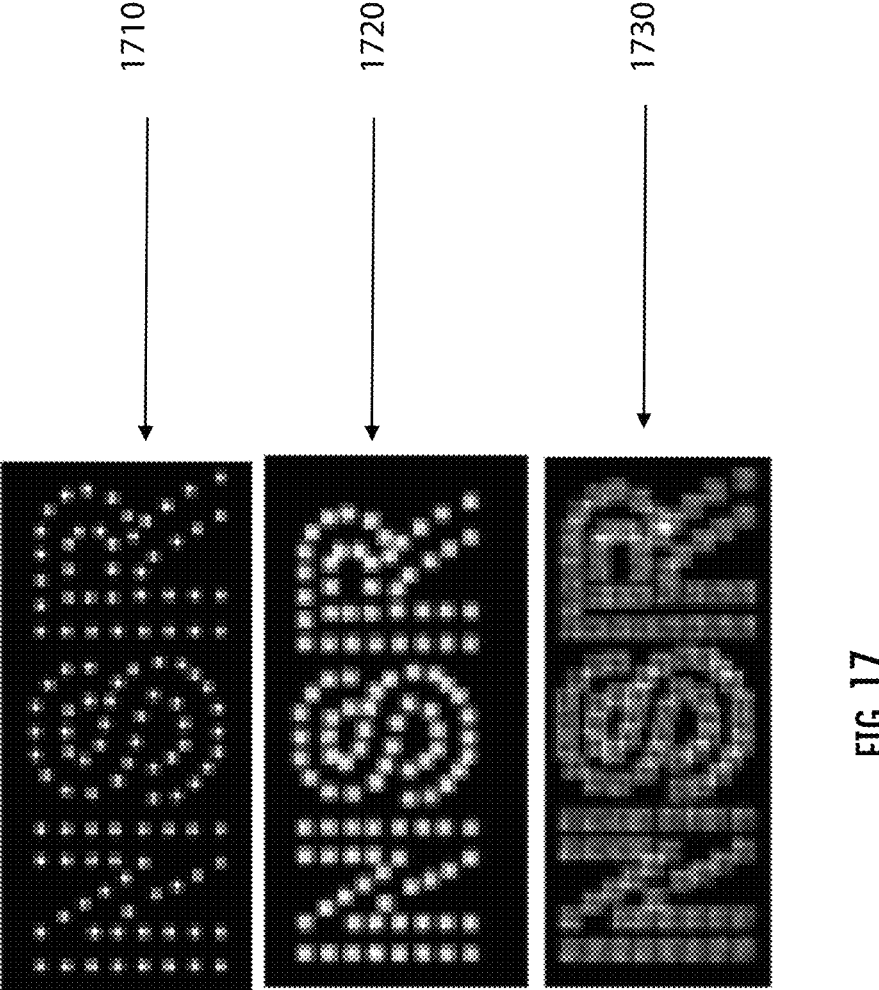
FIG. 17 is a schematic diagram showing a possible dithering embodiment of the current invention.

FIG. 17 shows simulated examples of patch group dithering to reduce retinal image screen door effect. On the top of FIG. 17, a sparsely populated display pattern is shown 1710. In the center, a 2×2 dithering pattern is shown 1720. On the bottom, a 3×3 dithering pattern is shown 1730. In other words, FIG. 17 shows a sequence of simulated images produced using a Zemax optical design and modeling computer application. The image on the top is a single patch unit output. The display pixels are distinctly separated resulting in spacing between imaged spots similar to an exaggerated screen door effect. The middle image shows the image overlay where a half pixel offset is introduced in a 2×2 set of patch units. The bottom-most image shows the image where a one-third pixel offset is used in a 3×3 set of patch units.

In general, dithering herein means producing overlaid sub-images that are each translated by a fraction of a pixel pitch with regard to each other. Dithering may be useful if microdisplay pixels are significantly larger than the eye can resolve, such as resolving the spacing between pixels. Dithering can provide retinal image smoothing. Dithering can also be used to produce interlaced retinal images that create higher resolution images. Assuming that the microdisplay pixel layout is regularly spaced and permanent, the dithering effect may be achieved by shifting the lenslet location in a patch group by a fraction of a pixel relative to a reference lenslet. The shifted lenslets should preferably occur in both horizontal and vertical dimensions.

2.1 Patch Group Layout

In embodiments, patch units sharing a common retinal image can be assigned to patch groups. How those patch groups can be laid out across the TOM display—or the layout architecture—will depend on the patch group function and their use in enabling a particular application. In addition, the chosen real world view transparency can determine the number and density of the patch units.

Figure 18:
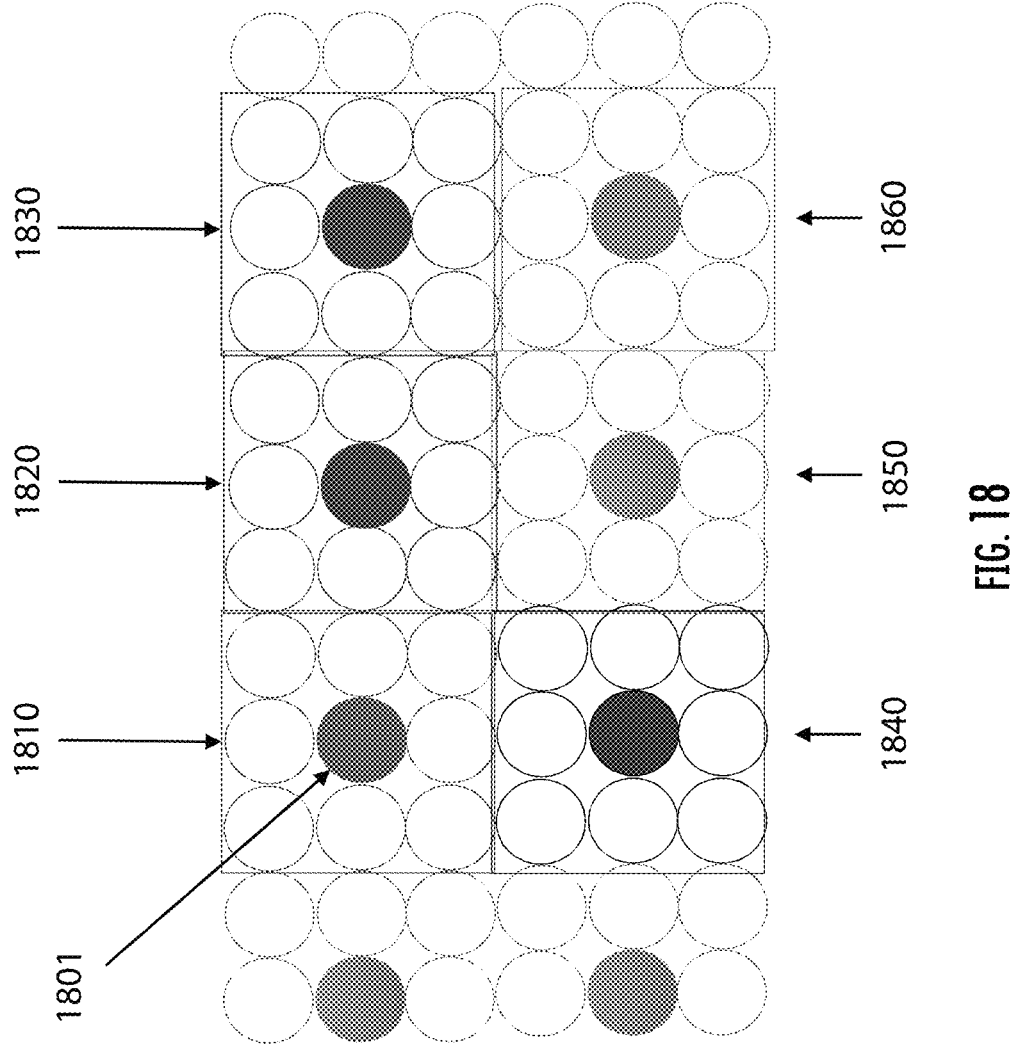
FIG. 18 is a schematic diagram showing a possible architectural layout embodiment of the current invention.

FIG. 18 shows one example of a dense patch group layout. (Concentrated pixel group layout. Colors and rectangular outlines indicate patch units of a common patch group (e.g., patch group 1 1810, patch group 2 1820, patch group 3 1830, patch group 4 1840, patch group 5 1850, and patch group 6 1860).) The patch group's patch units are identified by color within a square (patch group) showing the extent of the patch group (the patch units are notated by circles within the patch group squares (e.g., 1801)). In this example, a 3×3 set of circular lens patch units are grouped shoulder to shoulder (or next to one another). In this configuration several patch group members (patch units) will likely illuminate the eye pupil simultaneously or nearly simultaneously. This layout will prove useful for color generation, brightness enhancement, and dithering options.

Figure 19:
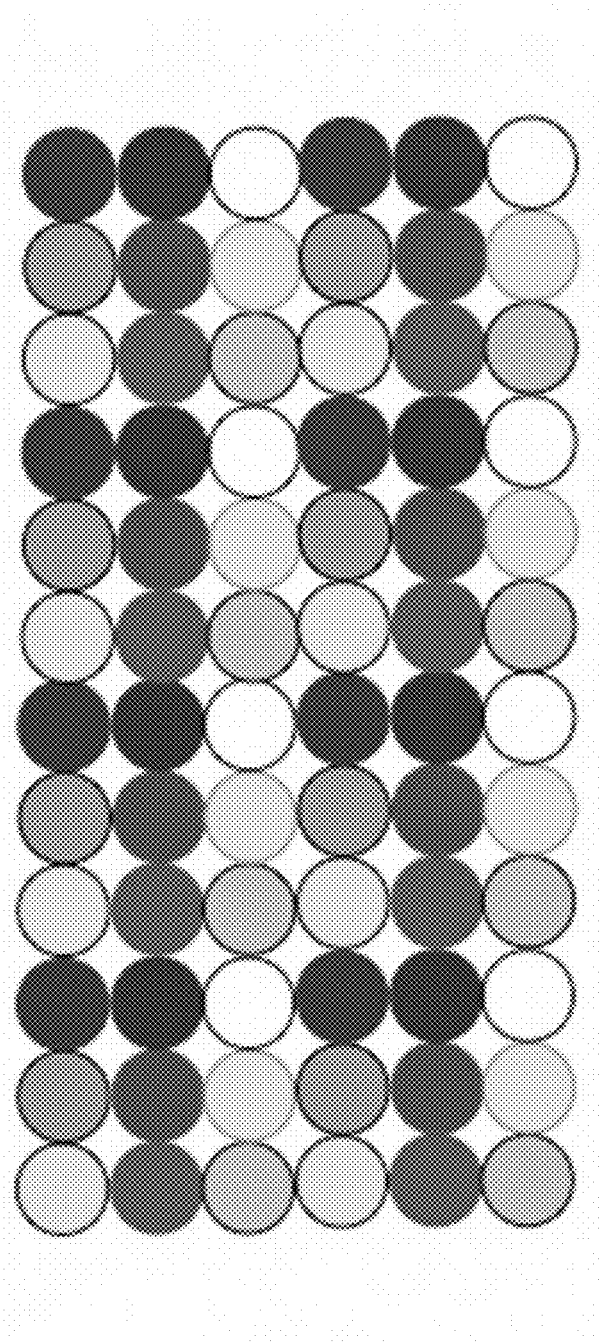
FIG. 19 is a schematic diagram showing a possible architectural layout embodiment of the current invention.

FIG. 19 shows a distributed and interlaced set of patch groups. In an embodiment, the patch units are identified by differently colored circles; circles with the same color are patch units of the same or common patch group in this particular embodiment. In this example, there are two patch units from other groups separating units of a patch group both horizontally and vertically. In this configuration, a few members of a patch group may illuminate the eye pupil simultaneously. This configuration would be useful for increasing eyebox size, gaze dependent viewing, or field of view.

It is also possible that a hybrid approach of a concentrated and dispersed layout will be preferable. The layout configuration will be determined during the design of the architecture for a specific application. Even though the layout has been shown configured as a rectangular grid array in the Figures, a hexagonal packing or arbitrary pattern may be selected. This arbitrary nature may prove necessary on curved surface TOMs.

Further regarding FIG. 19, the patch unit layout in a patch group may be determined by functionality. In this particular example/embodiment, similar color circles designate elements that make up a patch group. In this embodiment, pixel patches and/or patch units are interlaced, which is a way to increase eyebox size.

Accordingly, as disclosed herein, multi-range patch groups and a patch group(s), including pixels, pixel patches, lenslets, and patch units, provide benefits. Patch groups can be applied to both static and dynamic MLA-based architectures. Regarding uses for patch groups, benefits include but are not limited to:

Image brightness increase due to pixel patch or patch unit overlay;

Increased eyebox size when patch group is sparsely distributed;

Creation of multiple virtual image focal planes, depths, or distances as a result of lenslet optical power or effective focal length variations;

Varied field of view image quality vs. aperture size;

Color production via monochrome xLED areas; and

Dithering for enhancing resolution or reducing screen door effect.

Note—Pixel patches generally are smaller in size than lenslets, but not always.

The invention herein includes several Aspects, including:

Aspect 1: An optical system comprising:

a see-through near eye optical module comprising a see-through near eye display and a micro-lenslet array, wherein the see-through near eye display comprises one or more plurality of light-emitting pixels and the micro-lenslet array comprises one or more micro-lenslets;

wherein one of the one or more plurality of light-emitting pixels is configured as a pixel patch, and wherein the see-through near eye display comprises a plurality of pixel patches;

wherein the pixel patch is in optical communication with a micro-lenslet of the one or more micro-lenslets, wherein the pixel patch in optical communication with the micro-lenslet is configured as a patch unit, and wherein the see-through near eye optical module comprises a plurality of patch units;

wherein a first image or subimage and a second image or subimage from two or more of the plurality of patch units are directed along a common angular trajectory towards a user wearing the see-through optical module, wherein the first image or subimage is identical to the second image or subimage, wherein a first position of an eye of the user, a head of the user, or both the eye and the head of the user, results in the first image or subimage being directed to a portion of a retina of the user, and wherein when the user changes lateral displacement of the eye of the user, the head of the user, or both the eye and the head of the user, to a second position, the second image or subimage overlaps some or all of the portion of the retina of the user where the first image or subimage was directed; and wherein the see-through near eye display and the micro-lenslet array permit light rays from a physical object in an external environment to pass through the see-through near eye optical module to a retina of the user.

Aspect 2: The optical system of Aspect 1, wherein the see-through near eye display is partially, sparsely, mostly, or fully populated by the plurality of the light-emitting pixels or the plurality of the pixel patches.

Aspect 3: The optical system of Aspect 1, wherein images or subimages from different patch units of the plurality of patch units are at least one of the same, redundant, related, variant, or different, fragments of a larger image.

Aspect 4: The optical system of Aspect 1, wherein two or more of the one or more micro-lenslets have different optical powers or effective focal lengths.

Aspect 5: The optical system of Aspect 1, wherein a first micro-lenslet in a first patch unit has a different optical power or effective focal length than a second micro-lenslet in a second patch unit.

Aspect 6: The optical system of Aspect 1, wherein a first micro-lenslet in a first patch unit has a different optical power or effective focal length than a second micro-lenslet in a second patch unit, and wherein the difference in optical powers or effective focal lengths between the first micro-lenslet and the second micro-lenslet is capable of creating a perception by the user that images or subimages created by the first patch unit and the second patch unit are at different virtual image focal planes, distances, depths, or combinations thereof, from an eye of the user.

Aspect 7: The optical system of Aspect 1, wherein a first micro-lenslet in optical communication with a first group of pixel patches has a different optical power or effective focal length than a second micro-lenslet in optical communication with a second group of pixel patches, and wherein the difference in optical powers or effective focal lengths between the first micro-lenslet and the second micro-lenslet is capable of creating a perception by the user that images or subimages created by the first group of pixel patches and the second group of pixel patches are at different virtual image focal planes, distances, depths, or combinations thereof, from an eye of the user.

Aspect 8: The optical system of Aspect 1, wherein an optical power of a first micro-lenslet of a first patch unit is less than an optical power of a second micro-lenslet of a second patch unit or an effective focal length of the first micro-lenslet of the first patch unit is longer than an effective focal length of the second micro-lenslet of the second patch unit, and wherein beams from the first micro-lenslet appear to emit from a closer virtual image or subimage focal plane, distance, depth, or combination thereof, to an eye of the user.

Aspect 9: The optical system of Aspect 1, wherein micro-lenslet optical power or effective focal length differences across a micro-lenslet array comprising the micro-lenslets are capable of creating a perception by the user that images or subimages are appearing in more than one virtual image focal planes, distances, depths, or combinations thereof.

Aspect 10: The optical system of Aspect 9, wherein a desired virtual image focal plane, distance, depth, or combination thereof, a desired pixel patch or a desired patch unit is illuminated.

Aspect 11: The optical system of Aspect 1, wherein a first micro-lenslet in a first patch unit has a different aperture size than a second micro-lenslet in a second patch unit.

Aspect 12: The optical system of Aspect 1, wherein the optical system includes or supports multiple aperture size micro-lenslets.

Aspect 13: The optical system of Aspect 1, wherein one or more micro-lenslet in a middle area of a user gaze direction have an aperture size larger than one or more micro-lenslet in a peripheral area of the user gaze direction.

Aspect 14: The optical system of Aspect 1, wherein one or more micro-lenslet supporting direct gaze imaging have a larger aperture than one or more micro-lenslet supporting peripheral gaze angles.

Aspect 15: The optical system of Aspect 1, wherein the pixel patches are monochrome pixel patches, and wherein multiple pixel patches are blended together or overlapped to produce a perception by the user of color or increased resolution.

Aspect 16: The optical system of Aspect 1, wherein the pixel patches are monochrome pixel patches, and wherein images from the monochrome pixel patches are overlaid on the portion of the user's retina to create a perception by the user of color.

Aspect 17: The optical system of Aspect 1, wherein a subpixel size is offset between a first pixel patch and a second pixel patch or a first patch unit and a second patch unit.

Aspect 18: The optical system of Aspect 1, wherein a center-to-center pitch of a micro-lenslet is offset from an integral number of light-emitting pixels.

Aspect 19: The optical system of Aspect 1, wherein a center-to-center pitch of a micro-lenslet is offset from an integral number of light-emitting pixels, and wherein the offset from the integral number of light-emitting pixels is a fraction of a pixel.

Aspect 20: The optical system of Aspect 1, wherein the optical system produces overlaid images or subimages on the retina of the user, wherein each image or subimage is translated by a fraction of an imaged pixel pitch with respect to one another.

Aspect 21: The optical system of Aspect 1, wherein a first micro-lenslet location is shifted by a fraction of a pixel relative to a second micro-lenslet.

Aspect 22: The optical system of Aspect 1, wherein a first micro-lenslet location is shifted by a fraction of a pixel relative to a second micro-lenslet, and wherein the shift of the first micro-lenslet occurs in both horizontal and vertical dimensions.

Aspect 23: The optical system of Aspect 1, wherein the one or more micro-lenslets are at least one of static micro-lenslets or dynamic micro-lenslets.

Aspect 24: The optical system of Aspect 1, wherein an optical power or effective focal length of the one or more micro-lenslets determines magnification of at least one of the optical system, images, or subimages.

Aspect 25: The optical system of Aspect 1, wherein the optical system comprises multiple pixel patches and/or multiple patch units capable of operating independently of one another.

Aspect 26: The optical system of Aspect 1, wherein the one or more micro-lenslets have a diameter smaller than that of a pupil of an eye of the user.

Aspect 27: The optical system of Aspect 1, wherein the system produces multiple virtual image or subimage focal planes, distances, depths, or combinations thereof, as perceived by the user by overlaying retinal images produced by patch units of the plurality of patch units.

Aspect 28: The optical system of Aspect 1, wherein a primary patch unit is supplemented by one or more additional patch units that are capable of producing an overlaying image or subimage on a retina of the user.

Aspect 29: The optical system of Aspect 1, wherein overlaid images or subimages produced by two or more patch units increase image brightness, increase eye box size, or combinations thereof.

Aspect 30: The optical system of Aspect 1, wherein two or more pixel patches of the plurality of pixel patches produce the same or redundant images on a retina of the user, thereby rendering the optical system capable of locating individual pixel patches of the two or more pixel patches at different areas of the see-through near eye display.

Aspect 31: The optical system of Aspect 1, wherein a first optical power or effective focal length of a primary patch unit differs from a second optical power or effective focal length of a secondary patch unit, wherein the differing optical powers or effective focal lengths of the primary patch unit and the secondary patch unit cause an image or subimage produced by the primary patch unit to appear to be focused at a different virtual image or subimage focal plane, distance, depth, or combination thereof, than an image or subimage produced by the secondary patch unit.

Aspect 32: The optical system of Aspect 1, wherein multiple pixel patches produce similar or identical overlapping retinal images independent of where the multiple pixel patches are arranged across the see-through near eye display.

Aspect 33: The optical system of Aspect 1, wherein a patch unit focuses beams from the patch unit to appear to an eye of the user as though an image or subimage produced by the patch unit is located at an infinite distance or infinite conjugate, wherein light rays from the patch unit form constant diameter beams traveling away from the patch unit towards the eye of the user, and wherein as the beams propagate they diverge from a center on-axis beam.

Aspect 34: The optical system of Aspect 1, wherein the see-through near eye optical module is attached to, connected to, or embedded within an optic.

Aspect 35: The optical system of Aspect 34, wherein the optic is an eyeglass lens or a contact lens.

Embodiments of the invention also include a computer readable medium comprising one or more computer files containing applications, frameworks, libraries, and such, comprising a set of computer-executable instructions for performing one or more of the calculations, steps, processes and operations described and/or depicted herein. In exemplary embodiments, the files may be stored contiguously or non-contiguously on the computer-readable and/or device-readable medium. Embodiments may include a computer program product comprising the computer files, either in the form of the computer-readable medium comprising the computer files and, optionally, made available to a consumer through packaging, or alternatively made available to a consumer through electronic distribution. A s used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), memory card, and RAM. In exemplary embodiments, the computer readable medium has a set of instructions stored thereon which, when executed by a processor, cause the processor to perform tasks, based on data stored in the electronic database on the computer or cloud, or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers, in personal communication device and/or devices, or be stored in cloud computer. A skilled artisan will further appreciate, in light of this disclosure, how the invention can be implemented, in addition to software, using hardware or firmware. As such, as used herein, the operations of the invention can be implemented in a system comprising a combination of software, hardware, and/or firmware.

Embodiments of this disclosure include one or more computers or devices loaded with a set of the computer-executable instructions described herein. The computers or devices may be a general purpose computer, a special-purpose computer, personal communication device, personal wearable device, or other programmable data processing apparatus to produce a particular machine, such that the one or more computers or devices are instructed and configured to carry out the calculations, sensor data collecting and processing, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (e.g., processor or System on Chip ("SOC")) and a form of computer-readable memory which may include random-access memory ("RAM") or read-only memory ("ROM"). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer (optical) system may include various sensors, such as ALS (ambient light sensor) to regulate the brightness of the display depending on ambient light, or a temperature sensor that monitors the internal temperature of the TOM to ensure an operating temperature is within a set, specified, preferred, or "spec" range. The computer system can include a stand-alone computer, such as a desktop computer, a portable computer, such as a tablet, laptop, PDA, wearable device (e.g., electronic watch, smart glasses or HMD—Head Mounted Display), or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output user interfaces may include a graphical user interface (GUI), voice command interface, gesture interface, gaze interface, or combinations thereof, which may be used in conjunction with the computer-executable code and electronic databases. The graphical user interface gesture interface, gaze interface, or combinations thereof, may allow a user to perform these tasks through the use of text fields, check boxes, pull-downs, command buttons, voice commands, various gestures gaze as a selection mechanism, and the like. A skilled artisan will appreciate how such user features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

As used herein, the term "about" refers to plus or minus 5 units (e.g., percentage) of the stated value.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

As used herein, the term "substantial" and "substantially" refers to what is easily recognizable to one of ordinary skill in the art.

It is to be understood that the phraseology and terminology employed herein is not to be construed as limiting and are for descriptive purpose only.

It is to be understood that while certain of the illustrations and figure may be close to the right scale, most of the illustrations and figures are not intended to be of the correct scale.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

The invention claimed is:

1. An optical system comprising:
   a see-through near eye optical module comprising a see-through near eye display and a micro-lenslet array, wherein the see-through near eye display comprises one or more plurality of light-emitting pixels and the micro-lenslet array comprises one or more micro-lenslets;
   wherein one of the one or more plurality of light-emitting pixels is configured as a pixel patch, and wherein the see-through near eye display comprises a plurality of pixel patches;
   wherein the pixel patch is in optical communication with a micro-lenslet of the one or more micro-lenslets, wherein the pixel patch in optical communication with the micro-lenslet is configured as a patch unit, and wherein the see-through near eye optical module comprises a plurality of patch units;

wherein a first image or subimage and a second image or subimage from two or more of the plurality of patch units are directed along a common angular trajectory towards a user wearing the see-through near eye optical module, wherein the first image or subimage is identical to the second image or subimage, wherein a first position of an eye of the user, a head of the user, or both the eye and the head of the user, results in the first image or subimage being directed to a portion of a retina of the user, and wherein when the user changes lateral displacement of the eye of the user, the head of the user, or both the eye and the head of the user, to a second position, the second image or subimage overlaps some or all of the portion of the retina of the user where the first image or subimage was directed; and wherein the see-through near eye display and the micro-lenslet array permit light rays from a physical object in an external environment to pass through the see-through near eye optical module to the retina of the user.

2. The optical system of claim 1, wherein the see-through near eye display is partially, sparsely, mostly, or fully populated by the one or more plurality of light-emitting pixels or the plurality of pixel patches.

3. The optical system of claim 1, wherein images or subimages from different patch units of the plurality of patch units are at least one of same, redundant, related, variant, or different, fragments of a larger image.

4. The optical system of claim 1, wherein two or more of the one or more micro-lenslets have different optical powers or effective focal lengths.

5. The optical system of claim 1, wherein a first micro-lenslet in a first patch unit has a different optical power or effective focal length than a second micro-lenslet in a second patch unit.

6. The optical system of claim 1, wherein a first micro-lenslet in a first patch unit has a different optical power or effective focal length than a second micro-lenslet in a second patch unit, and wherein a difference in optical powers or effective focal lengths between the first micro-lenslet and the second micro-lenslet is capable of creating a perception by the user that images or subimages created by the first patch unit and the second patch unit are at different virtual image focal planes, distances, depths, or combinations thereof, from the eye of the user.

7. The optical system of claim 1, wherein a first micro-lenslet in optical communication with a first group of pixel patches has a different optical power or effective focal length than a second micro-lenslet in optical communication with a second group of pixel patches, and wherein a difference in optical powers or effective focal lengths between the first micro-lenslet and the second micro-lenslet is capable of creating a perception by the user that images or subimages created by the first group of pixel patches and the second group of pixel patches are at different virtual image focal planes, distances, depths, or combinations thereof, from the eye of the user.

8. The optical system of claim 1, wherein an optical power of a first micro-lenslet of a first patch unit is less than an optical power of a second micro-lenslet of a second patch unit or an effective focal length of the first micro-lenslet of the first patch unit is longer than an effective focal length of the second micro-lenslet of the second patch unit, and wherein beams from the first micro-lenslet appear to emit from a closer virtual image or subimage focal plane, distance, depth, or combination thereof, to the eye of the user.

9. The optical system of claim 1, wherein micro-lenslet optical power or effective focal length differences across the micro-lenslet array comprising the one or more micro-lenslets are capable of creating a perception by the user that images or subimages are appearing in more than one virtual image focal planes, distances, depths, or combinations thereof.

10. The optical system of claim 9, wherein a desired virtual image focal plane, distance, depth, or combination thereof, a desired pixel patch or a desired patch unit is illuminated.

11. The optical system of claim 1, wherein a first micro-lenslet in a first patch unit has a different aperture size than a second micro-lenslet in a second patch unit.

12. The optical system of claim 1, wherein the optical system includes or supports multiple aperture size micro-lenslets.

13. The optical system of claim 1, wherein one or more micro-lenslets in a middle area of a user gaze direction have an aperture size larger than one or more micro-lenslets in a peripheral area of the user gaze direction.

14. The optical system of claim 1, wherein one or more micro-lenslets supporting direct gaze imaging have a larger aperture than one or more micro-lenslets supporting peripheral gaze angles.

15. The optical system of claim 1, wherein the plurality of pixel patches are monochrome pixel patches, and wherein multiple pixel patches are blended together or overlapped to produce a perception by the user of at least one of color, increased resolution, or increased brightness.

16. The optical system of claim 1, wherein the plurality of pixel patches are monochrome pixel patches, and wherein images from the monochrome pixel patches are overlaid on the portion of the retina of the user to create a perception by the user of color.

17. The optical system of claim 1, wherein a subpixel size is offset between a first pixel patch and a second pixel patch or a first patch unit and a second patch unit.

18. The optical system of claim 1, wherein a center-to-center pitch of the one or more micro-lenslets is offset from an integral number of light-emitting pixels.

19. The optical system of claim 1, wherein a center-to-center pitch of the one or more micro-lenslets is offset from an integral number of light-emitting pixels, and wherein the offset from the integral number of light-emitting pixels is a fraction of a pixel.

20. The optical system of claim 1, wherein the optical system produces overlaid images or subimages on the retina of the user, wherein each overlaid image or subimage is translated by a fraction of an imaged pixel pitch with respect to one another.

21. The optical system of claim 1, wherein a first micro-lenslet location is shifted by a fraction of a pixel relative to a second micro-lenslet.

22. The optical system of claim 1, wherein a first micro-lenslet location is shifted by a fraction of a pixel relative to a second micro-lenslet, and wherein the shift of the first micro-lenslet occurs in both horizontal and vertical dimensions.

23. The optical system of claim 1, wherein the one or more micro-lenslets are at least one of static micro-lenslets or dynamic micro-lenslets.

24. The optical system of claim 1, wherein an optical power or effective focal length of the one or more micro-lenslets determines magnification of at least one of the optical system, images, or subimages.

25. The optical system of claim 1, wherein the optical system comprises multiple pixel patches and/or multiple patch units capable of operating independently of one another.

26. The optical system of claim 1, wherein the one or more micro-lenslets have a diameter smaller than that of a pupil of the eye of the user.

27. The optical system of claim 1, wherein the optical system produces multiple virtual image or subimage focal planes, distances, depths, or combinations thereof, as perceived by the user by overlaying retinal images produced by patch units of the plurality of patch units.

28. The optical system of claim 1, wherein a primary patch unit is supplemented by one or more additional patch units that are capable of producing an overlaying image or subimage on the retina of the user.

29. The optical system of claim 1, wherein overlaid images or subimages produced by two or more patch units increase image brightness, increase eye box size, or combinations thereof.

30. The optical system of claim 1, wherein two or more pixel patches of the plurality of pixel patches produce same or redundant images on the retina of the user, thereby rendering the optical system capable of locating individual pixel patches of the two or more pixel patches at different areas of the see-through near eye display.

31. The optical system of claim 1, wherein a first optical power or effective focal length of a primary patch unit differs from a second optical power or effective focal length of a secondary patch unit, wherein the differing optical powers or effective focal lengths of the primary patch unit and the secondary patch unit cause an image or subimage produced by the primary patch unit to appear to be focused at a different virtual image or subimage focal plane, distance, depth, or combination thereof, than an image or subimage produced by the secondary patch unit.

32. The optical system of claim 1, wherein multiple pixel patches produce similar or identical overlapping retinal images independent of where the multiple pixel patches are arranged across the see-through near eye display.

33. The optical system of claim 1, wherein the patch unit focuses beams from the patch unit to appear to the eye of the user as though an image or subimage produced by the patch unit is located at an infinite distance or infinite conjugate, wherein light rays from the patch unit form constant diameter beams traveling away from the patch unit towards the eye of the user, and wherein, as the constant diameter beams propagate, the constant diameter beams diverge from a center on-axis beam.

34. The optical system of claim 1, wherein the see-through near eye optical module is attached to, connected to, or embedded within an optic.

35. The optical system of claim 34, wherein the optic is an eyeglass lens or a contact lens.

\* \* \* \* \*